United States Patent
Castagna et al.

(10) Patent No.: US 10,361,853 B2
(45) Date of Patent: Jul. 23, 2019

(54) AUTOMATED DATA AUTHENTICATION AND SERVICE AUTHORIZATION VIA CRYPTOGRAPHIC KEYS IN A PRIVATE BLOCKCHAIN

(71) Applicant: BANK OF AMERICA CORPORATION, Charlotte, NC (US)

(72) Inventors: Brandon Matthew Castagna, Mount Holly, NC (US); Kevin Ben Hicks, Huntersville, NC (US)

(73) Assignee: Bank of America Corporation, Charlotte, NC (US)

(*) Notice: Subject to any disclaimer, the term of this patent is extended or adjusted under 35 U.S.C. 154(b) by 154 days.

(21) Appl. No.: 15/291,803

(22) Filed: Oct. 12, 2016

(65) Prior Publication Data
US 2018/0103042 A1    Apr. 12, 2018

(51) Int. Cl.
  *H04L 29/06*    (2006.01)
  *H04L 9/30*     (2006.01)
  *H04L 9/32*     (2006.01)

(52) U.S. Cl.
  CPC .............. *H04L 9/30* (2013.01); *H04L 9/3236* (2013.01); *H04L 9/3247* (2013.01); *H04L 63/0428* (2013.01); *H04L 63/08* (2013.01); *H04L 2209/38* (2013.01); *H04L 2209/56* (2013.01)

(58) Field of Classification Search
  CPC ..... H04L 63/126; H04L 9/30; H04L 63/0442; H04L 63/102; H04L 63/08; H04N 21/00; G06Q 20/401; G06Q 20/102; G06Q 2220/00; G06Q 2220/10; G06Q 10/0631; G06Q 10/063114; G06Q 10/08; G06Q 10/103; G06Q 10/1097; G06Q 20/06; G06Q 20/065; G06Q 20/0655; G06Q 20/0658; G06Q 20/123
  USPC .................................................. 713/168, 171
  See application file for complete search history.

(56) References Cited

U.S. PATENT DOCUMENTS

| | | |
|---|---|---|
| 5,471,604 A | 11/1995 | Hasbun et al. |
| 5,479,633 A | 12/1995 | Wells et al. |
| 5,535,369 A | 7/1996 | Wells et al. |
| 5,586,285 A | 12/1996 | Hasbun et al. |
| 5,740,395 A | 4/1998 | Wells et al. |
| 5,812,877 A | 9/1998 | Young |
| 5,822,781 A | 10/1998 | Wells et al. |
| 5,892,969 A | 4/1999 | Young |
| 6,061,449 A | 5/2000 | Candelore et al. |
| 6,199,121 B1 | 3/2001 | Olson et al. |
| 6,324,598 B1 | 11/2001 | Olson et al. |

(Continued)

*Primary Examiner* — Taghi T Arani
*Assistant Examiner* — Lin Chang
(74) *Attorney, Agent, or Firm* — Michael A. Springs; Moore & Van Allen PLLC; Seongun M. Hong

(57) ABSTRACT

Embodiments of the present invention provide a system for authenticating records belonging to an individual or entity and providing authorized access of the records to service providers. Embodiments of the invention utilize a private blockchain to store various types of records to be conveyed to the service providers. In this way, the individual or entity may securely store on the blockchain all records relevant to service providers, then provide the service providers with secured access to the records such that the providers may access only the specific records for which they are authorized, e.g. a healthcare provider may access only the healthcare records on the blockchain.

12 Claims, 15 Drawing Sheets

(56) References Cited

U.S. PATENT DOCUMENTS

| | | |
|---|---|---|
| 6,324,599 B1 | 11/2001 | Zhou et al. |
| 6,414,961 B1 | 7/2002 | Katayanagi |
| 7,200,226 B2 | 4/2007 | Bace |
| 2001/0049726 A1 | 12/2001 | Comeau et al. |
| 2002/0016869 A1 | 2/2002 | Comeau et al. |
| 2003/0018680 A1 | 1/2003 | Iglesias et al. |
| 2004/0177216 A1 | 9/2004 | Asari et al. |
| 2005/0149739 A1 | 7/2005 | Hopkins et al. |
| 2012/0005192 A1 | 1/2012 | Bao et al. |
| 2017/0109735 A1* | 4/2017 | Sheng ................ G06Q 20/3678 |
| 2017/0124556 A1* | 5/2017 | Seger, II ............ G06Q 20/3829 |
| 2017/0236121 A1* | 8/2017 | Lyons .................. G06Q 20/102 |
| | | 705/71 |
| 2017/0352116 A1* | 12/2017 | Pierce ................ G06Q 50/184 |
| 2018/0039667 A1* | 2/2018 | Pierce ............... G06Q 20/0658 |
| 2018/0182042 A1* | 6/2018 | Vinay .................... G06Q 40/12 |
| 2018/0268479 A1* | 9/2018 | Dowling ............. G06Q 40/025 |

\* cited by examiner

AUTOMATED DATA AUTHENTICATION AND SERVICE AUTHORIZATION VIA CRYPTOGRAPHIC KEYS IN A PRIVATE BLOCKCHAIN

BACKGROUND

With the advent of the internet, it has become common for individuals and entities to utilize the internet to share their personal or business records with providers of numerous services. For instance, the individual or entity may use the internet send copies of their records to the various service providers by using e-mail attachments or by uploading the files to the provider's servers through the provider's website.

There are a number of disadvantages to using this type of electronic record sharing method. First, this method requires the individual or entity to repeat the record sending process for each record and service provider, creating inefficiencies within the computer systems involved in the transaction. Second, the traditional methods of sending records are susceptible to data corruption, as they typically lack a built-in mechanism for authenticating records. Finally, traditional methods are more prone to attacks from unauthorized parties.

Accordingly, there is a need for an efficient, secure, and reliable way to provide access of an individual or entity's records to a service provider.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system for expediting validation and authorization of transactions between end points, an upstream networked system comprising an upstream processor, a memory device, and a communication device, and an upstream application stored in the memory device, wherein the upstream application comprises a private blockchain, wherein the private blockchain comprises at least one transactional record; a downstream networked system comprising a downstream processor, a memory device, and a communication device, and a downstream application stored in the memory device, wherein the downstream application comprises a consolidated blockchain comprising the at least one transactional record within the private blockchain, wherein the consolidated blockchain is wherein an access restriction prevents the upstream networked system from accessing the consolidated blockchain; and a plurality of nodes on the consolidated blockchain, wherein the plurality of nodes comprises: a miner node comprising a miner networked system comprising a miner processor, a memory device, and a communication device, and a miner application stored in the memory device; a channel node comprising a channel networked system comprising a channel processor, a memory device, and a communication device, and a channel application stored in the memory device; a payments node comprising a payments networked system comprising a payments processor, a memory device, and a communication device, and a payments application stored in the memory device; and a clearing node comprising a clearing networked system comprising a clearing processor, a memory device, and a communication device, and a clearing application stored in the memory device.

The miner application when executed by the miner processor causes the miner processor to validate a pending transactional record within the consolidated blockchain and generate a channel record on the consolidated blockchain. The channel application when executed by the channel processor causes the channel processor to detect a channel record from the consolidated blockchain; determine that the channel record requires the channel node to further process the transaction; further process the transaction by conducting a first step; and publish a pending payments record to the consolidated blockchain. The payments application when executed by the payments processor causes the payments processor to detect that a payments record has been validated by the miner node; determine that the payments record requires the payments node to further process the transaction; further process the transaction by conducting a second step; and publish a pending clearing record to the consolidated blockchain. The clearing application when executed by the clearing processor causes the clearing processor to detect that a clearing record has been validated by the miner node; determine that the clearing record requires the clearing node to further process the transaction; and further process the transaction by conducting a third step.

In some embodiments, the upstream application comprises a private ledger, the private ledger comprising an upstream account; an allocation of resources associated with the upstream account; and a set of metadata associated with the allocation of resources. The downstream application comprises an internal ledger, wherein the internal ledger comprises a set of internal records. The private ledger when executed by the upstream processor causes the upstream processor to publish a pending private transactional record to the private blockchain based on a change in the allocation of resources associated with the upstream account. The internal ledger when executed by the downstream processor causes the downstream processor to detect, via the consolidated blockchain, a consolidated transactional record comprising the change in the allocation of resources associated with the upstream account and automatically create a copy of the change within the set of internal records.

In some embodiments, the first step comprises configuring the channel application to invoke a plurality of channel microservices, wherein the channel microservices when executed by the channel processor cause the channel processor to initiate payment instructions; validate the payment instructions; and release the payment instructions.

In some embodiments, the second step comprises configuring the payments application to invoke a plurality of payments microservices, wherein the payments microservices when executed by the payments processor cause the payments processor to receive a payment; preprocess the payment; and process the payment.

In some embodiments, the third step comprises configuring the clearing application to invoke a plurality of clearing microservices, wherein the clearing microservices when executed by the clearing processor cause the clearing processor to receive payment instructions; preprocess the payment; and process the payment.

In some embodiments, the plurality of nodes further comprises a monitoring node, the monitoring node comprising a monitoring networked system comprising a monitoring processor, a memory device and a communication device, wherein a monitoring application is stored on the memory device, wherein the monitoring application when executed by the monitoring processor causes the monitoring processor to calculate a transaction flow rate within the private blockchain.

In some embodiments, the transactional record comprises a public key, the public key comprising an ID of a sender, wherein the plurality of nodes each comprise a database, the database comprising a list of authorized senders, and wherein each of the plurality of nodes are further configured to compare the ID of the sender to the list of authorized senders; detect that the ID of the sender is not found in the list of authorized senders; and decline to process the transaction.

According to one embodiment of the present invention, a system for expediting validation and authorization of transactions between end points is provided, comprising an upstream networked system comprising an upstream processor, a memory device, and a communication device, and an upstream application stored in the memory device, the upstream application comprising a private blockchain, wherein the private blockchain comprises at least one transactional record, and a private ledger comprising computer-readable instructions and comprising an upstream account; an allocation of resources associated with the upstream account; and a set of metadata associated with the allocation of resources. The system further comprises a downstream networked system comprising a downstream processor, a memory device, and a communication device, and a downstream application stored in the memory device, the downstream application comprising a consolidated blockchain comprising the at least one transactional record within the private blockchain, wherein an access restriction prevents the upstream networked system from accessing the consolidated blockchain and an internal ledger, the internal ledger comprising computer-readable instructions and comprising a copy of the private ledger. The system further comprises a plurality of nodes on the private blockchain, wherein the plurality of nodes comprises at least one miner node, the at least one miner node comprising a miner networked system comprising a miner processor, a memory device, and a communication device, and a miner application stored in the memory device, the miner application when executed by the miner processor cause the miner processor to validate a pending consolidated transactional record within the consolidated blockchain and generate a consolidated transactional record on the consolidated blockchain. The private ledger when executed by the upstream processor causes the upstream processor to detect a change in the account or the allocation of resources associated with the account; and publish a pending private transactional record to the private blockchain based on the change in the account or the allocation of resources associated with the account to the private blockchain. The internal ledger when executed by the downstream processor causes the downstream processor to detect the consolidated transactional record from the consolidated blockchain and modify the copy of the private ledger within the internal ledger based on the consolidated transactional record.

In some embodiments, the plurality of nodes further comprises at least one channel node, the at least one channel node comprising a channel networked system comprising a channel processor, a memory device, and a communication device, and a channel application stored in the memory device, wherein the channel application when executed by the channel processor causes the channel processor to detect a channel record from the consolidated blockchain; determine that the channel record requires the channel node to further process the transaction; further process the transaction by conducting a first step; and publish a pending payments record to the consolidated blockchain.

In some embodiments, the first step comprises configuring the channel application to invoke a plurality of channel payment microservices, the plurality of channel payment microservices when executed by the channel processor causing the channel processor to initiate payment instructions; validate the payment instructions; and release the payment instructions.

In some embodiments, the plurality of nodes further comprises at least one payments node, the at least one payment node comprising a payments networked system comprising a payments processor, a memory device, and a communication device, and a payments application stored in the memory device, wherein the payments application when executed by the payments processor causes the payments processor to detect that a payments record has been validated by the miner node; determine that the payments record requires the payments node to further process the transaction; further process the transaction by conducting a second step; and publish a pending clearing record to the consolidated blockchain.

In some embodiments, the second step comprises configuring the payments application to invoke a plurality of payments execution microservices, the plurality of payments execution microservices when executed by the payments processor cause the payments processor to receive a payment; preprocess the payment; and process the payment.

In some embodiments, the plurality of nodes further comprises at least one clearing node, the at least one clearing node comprising a clearing networked system comprising a clearing processor, a memory device, and a communication device, and a clearing application stored in the memory device, wherein the clearing application when executed by the clearing processor cause the clearing processor to detect that a clearing record has been validated by the miner node; determine that the clearing record requires the clearing node to further process the transaction; and further process the transaction by conducting a third step.

In some embodiments, the third step comprises configuring the clearing application to invoke a plurality of clearing payments microservices, the plurality of clearing payments microservices when executed by the clearing processor cause the clearing processor to receive payment instructions; preprocess the payment; and process the payment.

In some embodiments, the plurality of nodes further comprises a monitoring node, the monitoring node comprising a monitoring networked system comprising a monitoring processor, a memory device, and a communication device, wherein a monitoring application is stored on the memory device, the monitoring application when executed by the monitoring processor causing the monitoring processor to calculate a transaction flow rate within the private blockchain.

In some embodiments, the transactional record comprises an authorization key, the authorization key comprising an ID of a sender, wherein the plurality of nodes each comprise a database, the database comprising a list of authorized senders, and wherein the plurality of nodes are further configured to compare the ID of the sender to the list of authorized senders; detect that the ID of the sender is not found in the list of authorized senders; and decline to process the transaction.

According to one embodiment of the present invention, a computer-implemented method of expediting validation and authorization of transactions between an upstream processor of an upstream networked system and a downstream processor of a downstream networked system using a plurality of nodes is provided. The upstream networked system comprises a memory device and a communication device, wherein an upstream application is stored on the memory device, the upstream application comprising a private ledger, the private ledger comprising an upstream account; an allocation of resources associated with the upstream account; and a set of metadata associated with the allocation of resources. The downstream networked system comprises a memory device and a communication device, wherein a downstream application is stored on the memory device, the downstream application comprising an internal ledger, the internal ledger comprising a copy of the private ledger. The plurality of nodes comprises at least one miner node, the at least one miner node comprising a miner networked system comprising a miner processor, a memory device and a communication device, wherein a miner application is stored on the memory. The method comprises detecting, by the upstream processor executing the private ledger, a change in the account or the allocation of resources associated with the account; publishing, by the upstream processor executing the private ledger, a pending transactional record to a private blockchain comprising at least one transactional record and being distributed between the upstream system and the downstream system, wherein the pending transactional record comprises a record of the change in the account or the allocation of resources associated with the account; validating, by the miner processor executing the miner application, the pending transactional record within the private blockchain; generating, by the miner processor executing the miner application, a transactional record on the private blockchain; detecting, by the downstream processor executing the internal ledger, the transactional record from a consolidated blockchain comprising the at least one transactional record within the private blockchain, wherein an access restriction prevents the upstream networked system from accessing the consolidated blockchain; and modifying, by the downstream processor executing the internal ledger, the copy of the private ledger within the internal ledger based on the transactional record.

According to one embodiment of the present invention, a computer-implemented method of expediting validation and authorization of transactions between an upstream processor of an upstream networked system and a downstream processor of a downstream networked system using a plurality of upstream nodes and a plurality of downstream nodes is provided, wherein the upstream networked system comprises a memory device and a communication device, wherein an upstream application is stored on the memory device; wherein the downstream networked system comprises a memory device and a communication device, wherein a downstream application is stored on the memory device, wherein the plurality of upstream nodes are on a private blockchain distributed between the upstream application and the downstream application, wherein the private blockchain comprises at least one transactional record, wherein the plurality of downstream nodes are on a consolidated blockchain accessible by the downstream application, wherein the consolidated blockchain comprises the at least one transactional record within the private blockchain, wherein an access restriction prevents the upstream application from accessing the consolidated blockchain; wherein the plurality of downstream nodes comprises a miner node system, comprising a miner processor, a memory device and a communication device, wherein a miner application is stored on the memory device; a channel node system, comprising a channel processor, a memory device and a communication device, wherein a channel application is stored on the memory device; a payments node system, comprising a payments processor, a memory device and a communication device, wherein a payments application is stored on the memory device; and a clearing node system, comprising a clearing processor, a memory device and a communication device, wherein a clearing application is stored on the memory device. The method comprises validating, by the miner processor executing the miner application, pending transactional record within the consolidated blockchain; generating, by the miner processor executing the miner application, a channel record on the consolidated blockchain; detecting, by the channel processor executing the channel application, a channel record from the consolidated blockchain; determining, by the channel processor executing the channel application, that the channel record requires the channel node to further process the transaction; further processing, by the channel processor executing the channel application, the transaction by conducting a first step; publishing, by the channel processor executing the channel application, a pending payments record to the consolidated blockchain; detecting, by the payments processor executing the payments application, that a payments record has been validated by the miner node; determining, by the payments processor executing the payments application, that the payments record requires the payments node to further process the transaction; further processing, by the payments processor executing the payments application, the transaction by conducting a second step; and publishing, by the payments processor executing the payments application, a pending clearing record to the consolidated blockchain, detecting, by the clearing processor executing the clearing application, that a clearing record has been validated by the miner node; determining, by the clearing processor executing the clearing application, that the clearing record requires the clearing node to further process the transaction; and further processing, by the clearing processor executing the clearing application, the transaction by conducting a third step.

In some embodiments, the transactional record comprises an authorization key, the authorization key comprising an ID of a sender, wherein the plurality of nodes each comprise a database, the database comprising a list of authorized senders. The method further comprises comparing, by the processor of each node executing the application of each node, the ID of the sender to the list of authorized senders; detecting, by the processor of each node executing the application of each node, that the ID of the sender is not found in the list of authorized senders; and declining, by the processor of each node executing the application of each node, to process the transaction.

According to one embodiment of the present invention, a system for authenticating records and providing authorized access of said records to service providers is provided, comprising an upstream networked system comprising an upstream processor, a memory device, and a communication device, and an upstream application stored in the memory device, wherein the upstream application is in operative communication with the downstream application, wherein the upstream application comprises a private blockchain comprising at least one data record. The system further comprises a downstream networked system comprising a downstream processor, a memory device, and a communication device, and a downstream application stored in the memory device, and a plurality of nodes on the private blockchain, wherein the plurality of nodes comprises a miner node comprising a miner networked system comprising a miner processor, a memory device, and a communication device, and a miner application stored in the memory device. The upstream application when executed by the upstream processor causes the upstream processor to encrypt a pending data record to be received by the downstream application and publish the pending data record to the private blockchain. The miner application when executed by the miner processor causes the miner processor to validate the pending data record within the private blockchain and generate an authenticated data record on the private blockchain, wherein the authenticated data record comprises sender identification data. The downstream application when executed by the downstream processor causes the downstream processor to detect the authenticated data record within the private blockchain; decrypt the authenticated data record; and access the authenticated data record.

In some embodiments, the system further comprises a second downstream networked system comprising a second downstream processor, a memory device, and a communication device, and a second downstream application stored in the memory device, wherein the upstream application when executed by the upstream processor further causes the upstream processor to encrypt a second pending data record to be received by the second downstream application and publish the second pending data record to the private blockchain, wherein the miner application when executed by the miner processor causes the miner processor to validate the second pending data record within the private blockchain and generate a second authenticated data record on the private blockchain, wherein the second authenticated data record comprises the sender identification data, wherein the second downstream application when executed by the second downstream processor causes the second downstream processor to detect the second authenticated data record within the private blockchain; decrypt the second authenticated data record; and access the second authenticated data record.

In some embodiments, the downstream application when executed by the downstream processor further causes the downstream processor to write a subscription request record to the private blockchain, wherein the subscription request record comprises a first public key. The miner application when executed by the miner processor further causes the miner processor to detect the subscription request record on the private blockchain; prompt the upstream application to authorize the subscription request record; and validate the subscription request record. The upstream application when executed by the upstream processor further causes the upstream processor to authorize the subscription request record; and detect the first public key from the subscription request record.

In some embodiments, the upstream application comprises a first public key, wherein the downstream application comprises a first private key, wherein the first public key corresponds with the first private key, wherein the upstream application when executed by the upstream processor further causes the upstream processor to encrypt the pending data record using the first public key, and wherein the downstream application when executed by the downstream processor further causes the downstream processor to decrypt the authenticated data record using the first private key.

In some embodiments, the second downstream application when executed by the second downstream processor further causes the second downstream processor to write a second subscription request record to the private blockchain, wherein the second subscription request record comprises a second public key. The miner application when executed by the miner processor further causes the miner processor to detect the second subscription request record on the private blockchain; prompt the upstream application to authorize the second subscription request record; and validate the second subscription request record. The upstream application when executed by the upstream processor further causes the upstream processor to authorize the second subscription request record; and detect the second public key from the subscription request record.

In some embodiments, the upstream application further comprises a first public key and a second public key, wherein the downstream application comprises a first private key, wherein the first public key corresponds with the first private key, wherein the second downstream application comprises a second private key, wherein the second public key corresponds with the second private key, wherein the upstream application when executed by the upstream processor further causes the upstream processor to encrypt the pending data record using the first public key and encrypt the second pending data record using the second public key, wherein the downstream application when executed by the downstream processor further causes the downstream processor to decrypt the authenticated data record using the first private key, and wherein the second downstream application when executed by the second downstream processor causes the downstream processor to decrypt the second authenticated data record using the second private key.

According to one embodiment of the present invention, a system for authenticating records and providing authorized access of said records to service providers is provided, comprising an upstream networked system comprising an upstream processor, a memory device, and a communication device, and an upstream application stored in the memory device, wherein the upstream application comprises a private blockchain comprising at least one data record. The system further comprises a downstream networked system comprising a downstream processor, a memory device, and a communication device, and a downstream application stored in the memory device and a plurality of nodes on the private blockchain. The upstream application when executed by the upstream processor causes the upstream processor to encrypt a data record to be received by the downstream application; and publish the data record to the private blockchain. The downstream application when executed by the downstream processor causes the downstream processor to detect the data record within the private blockchain; decrypt the data record; and access the data record.

In some embodiments, the system further comprises a second downstream networked system comprising a second downstream processor, a memory device, and a communication device, and a second downstream application stored in the memory device, wherein the upstream application when executed by the upstream processor further causes the upstream processor to encrypt a second data record to be received by the second downstream application and publish the second data record to the private blockchain, wherein the second downstream application when executed by the second downstream processor causes the second downstream processor to detect the second data record within the private blockchain; decrypt the second data record; and access the second data record.

In some embodiments, the upstream application comprises a first public key, wherein the downstream application comprises a first private key, wherein the first public key corresponds with the first private key, wherein the upstream application when executed by the upstream processor further causes the upstream processor to encrypt the data record using the first public key, and wherein the downstream application when executed by the downstream processor further causes the downstream processor to decrypt the data record using the first private key.

In some embodiments, the upstream application further comprises a first public key and a second public key, wherein the downstream application comprises a first private key, wherein the first public key corresponds with the first private key, wherein the second downstream application comprises a second private key, wherein the second public key corresponds with the second private key, wherein the upstream application when executed by the upstream processor further causes the upstream processor to encrypt the data record using the first public key; and encrypt the second data record using the second public key, wherein the downstream application when executed by the downstream processor further causes the downstream processor to decrypt the data record using the first private key; and wherein the second downstream application when executed by the second downstream processor causes the downstream processor to decrypt the second data record using the second private key.

According to one embodiment of the present invention, a computer-implemented method for authenticating records and providing authorized access of said records from an upstream processor of an upstream networked system to a downstream processor of a downstream networked system using a plurality of nodes is provided, wherein the upstream networked system comprises a memory device and a communication device, wherein an upstream application is stored on the memory device, wherein the downstream networked system comprises a memory device and a communication device, wherein a downstream application is stored on the memory device, wherein the upstream networked system is in operative communication with the downstream networked system via a private blockchain, the private blockchain comprising at least one data record, and wherein the plurality of nodes are nodes on the private blockchain, and comprises a miner node comprising a miner networked system comprising a miner processor, a memory device, and a communication device, and a miner application stored in the memory device. Said method comprises encrypting, by the upstream processor executing the upstream application, a pending data record to be received by the downstream application; publishing, by the upstream processor executing the upstream application, the pending data record to the private blockchain; validating, by the miner processor executing the miner application, the pending data record within the private blockchain; generating, by the miner processor executing the miner application, an authenticated data record on the private blockchain, wherein the authenticated data record comprises sender identification data; detecting, by the downstream processor executing the downstream application, the authenticated data record within the private blockchain; decrypting, by the downstream processor executing the downstream application, the authenticated data record; and accessing, by the downstream processor executing the downstream application, the authenticated data record.

In some embodiments, a second downstream networked system is in operative communication with the upstream networked system, the second downstream networked system comprising a second downstream processor, a memory device, and a communication device, and a second downstream application stored in the memory device. The method further comprises encrypting, by the upstream processor executing the upstream application, a second pending record to be received by the second downstream application; publishing, by the upstream processor executing the upstream application, the second pending record to the private blockchain; validating, by the miner processor executing the miner application, the second pending record within the private blockchain; and generating, by the miner processor executing the miner application, a second authenticated record on the private blockchain, wherein the second authenticated record comprises the sender identification data; detecting, by the second downstream processor executing the second downstream application, the second authenticated record within the private blockchain; decrypting, by the second downstream processor executing the second downstream application, the second authenticated record; and accessing, by the second downstream processor executing the second downstream application, the second authenticated record.

In some embodiments, the method further comprises writing, by the downstream processor executing the downstream application, a subscription request record to the private blockchain, wherein the subscription request record comprises a first public key; detecting, by the miner processor executing the miner application, the subscription request record on the private blockchain; prompting, by the miner processor executing the miner application, the upstream application to authorize the subscription request record; authorizing, by the upstream processor executing the upstream application, the subscription request record; validating, by the miner processor executing the miner application the subscription request record; and detecting, by the upstream processor executing the upstream application, the first public key from the subscription request record.

In some embodiments, the upstream application comprises a first public key, wherein the downstream application comprises a first private key, wherein the first public key corresponds with the first private key. The method further comprises encrypting, by the upstream processor executing the upstream application, the pending record using the first public key and decrypting, by the downstream processor executing the downstream application, the authenticated record using the first private key.

In some embodiments, the computer-implemented method further comprises writing, by the second downstream processor executing the second downstream application, a second subscription request record to the private blockchain, wherein the second subscription request record comprises a second public key; detecting, by the miner processor executing the miner application, the second subscription request record on the private blockchain; prompting, by the miner processor executing the miner application, the upstream application to authorize the second subscription request record; authorizing, by the upstream processor executing the upstream application, the second subscription request record; validating, by the miner processor executing the miner application, the second subscription request record; and detecting, by the upstream processor executing the upstream application, the second public key from the subscription request record.

In some embodiments, the upstream application further comprises a first public key and the second public key, wherein the downstream application comprises a first private key, wherein the first private key corresponds with the first public key, wherein the second downstream application comprises a second private key, wherein the second private key corresponds with the second public key. The method further comprises encrypting, by the upstream processor executing the upstream application, the pending record using the first public key; encrypting, by the upstream processor executing the upstream application, the second pending record using the second public key, decrypting, by the downstream processor executing the downstream application, the authenticated record using the first private key; and decrypting, by the second downstream processor executing the second downstream application, the second authenticated record using the second private key.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
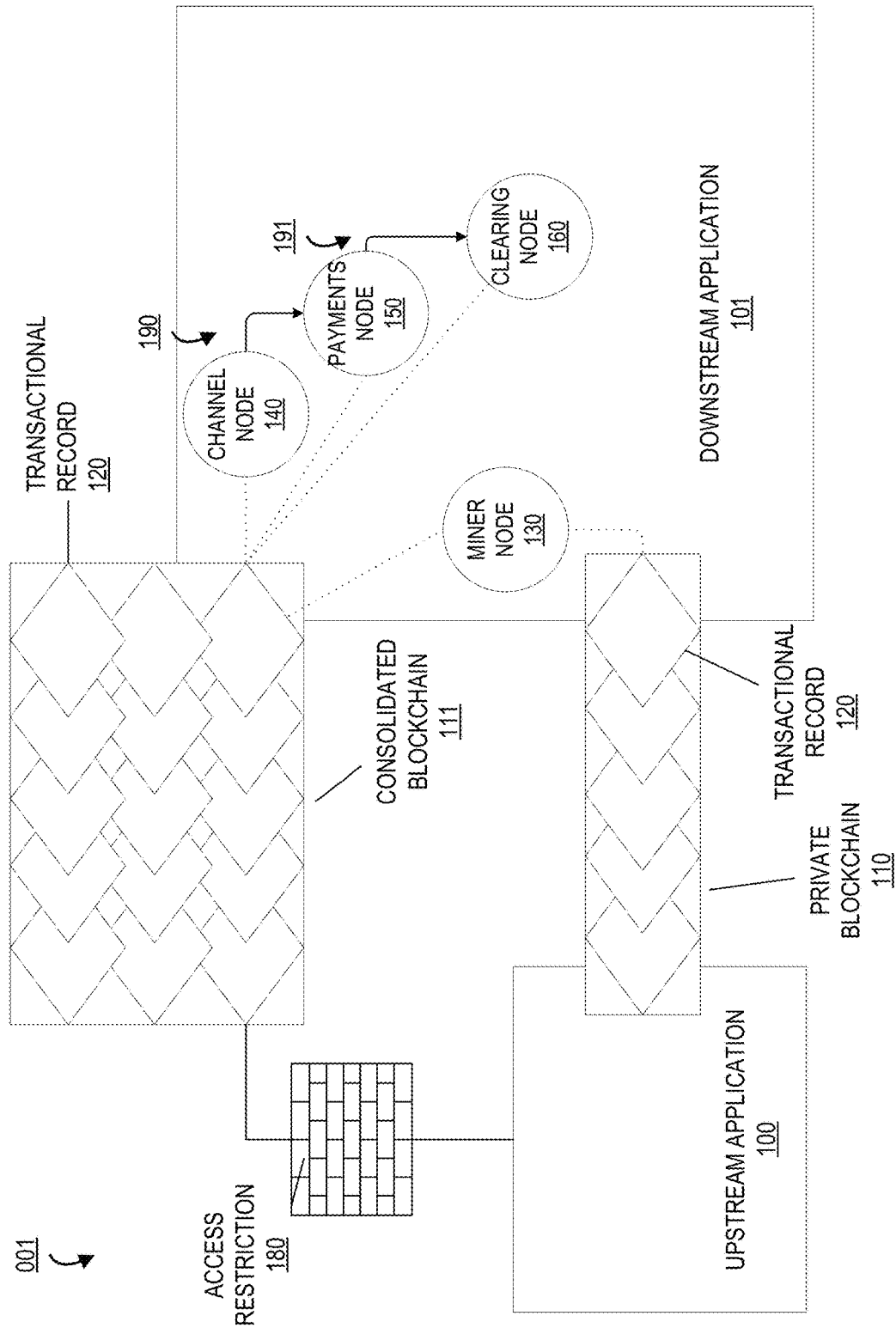
Figure 2:
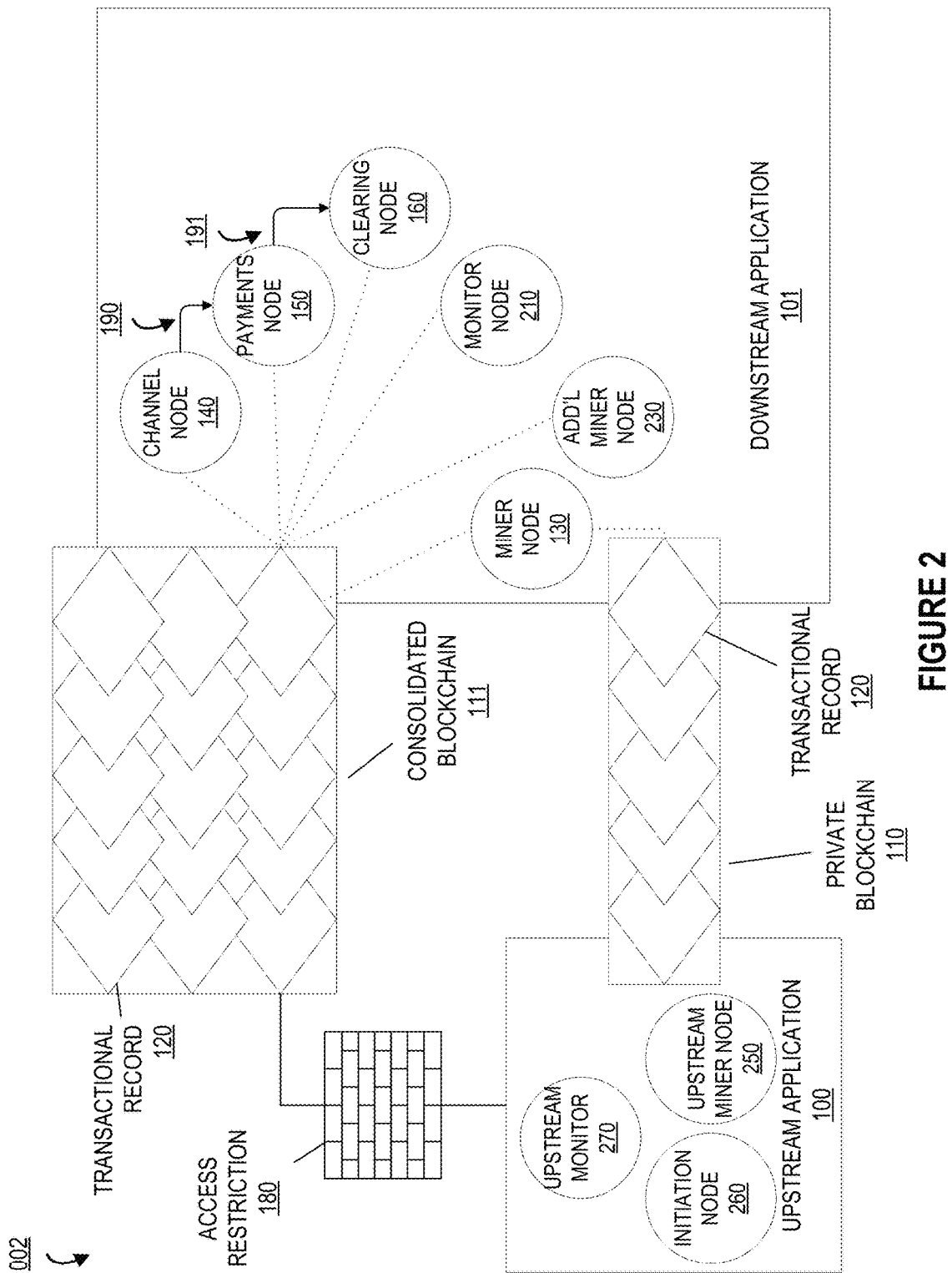
Figure 3:
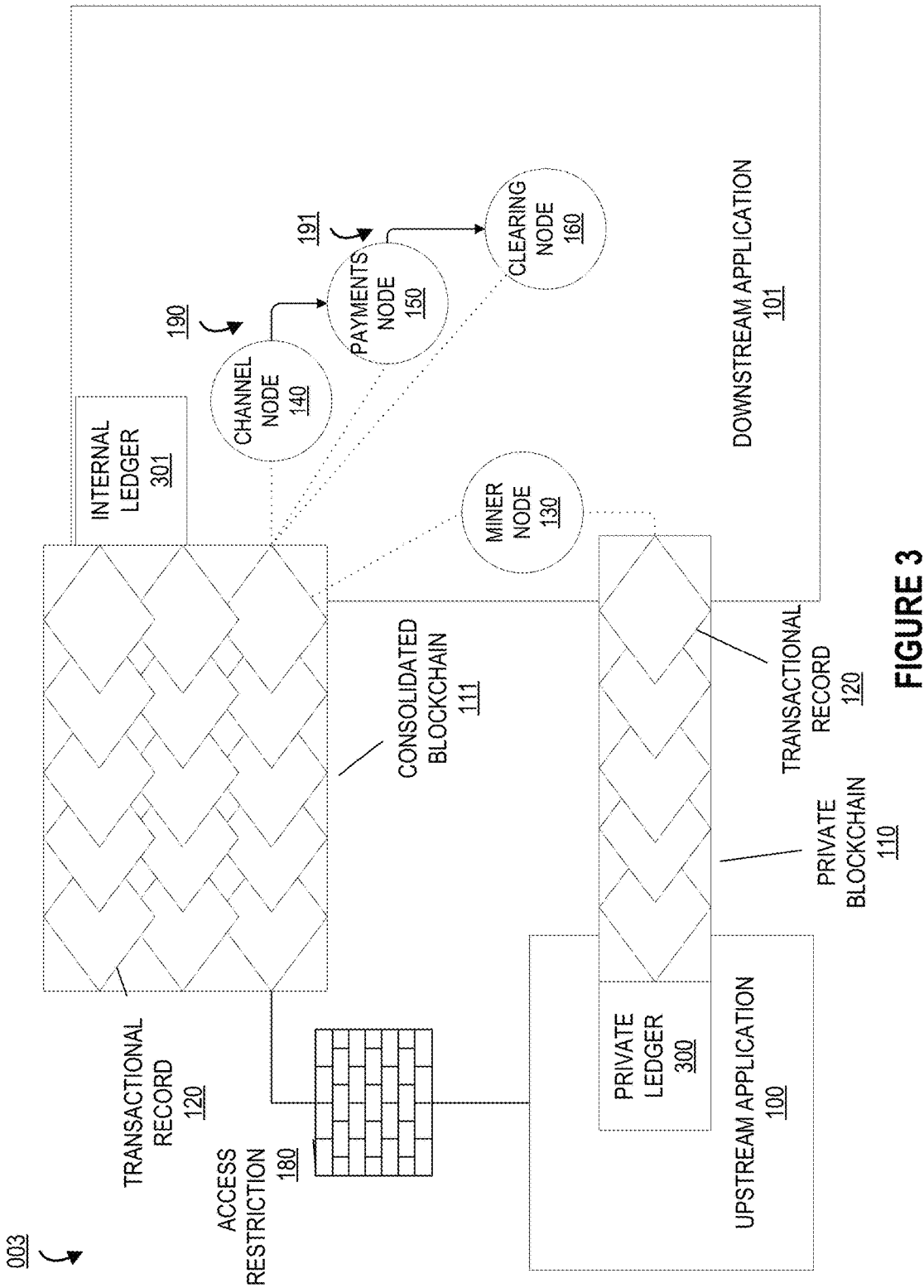

Having thus described embodiments of the invention in general terms, reference will now be made to the accompanying drawings, wherein:

FIG. 1 is a block diagram illustrating a high level overview of a system for expediting validation and authorization of transactions between end points, in accordance with one embodiment of the present invention;

FIG. 2 is a block diagram illustrating additional features of the private blockchain, in accordance with one embodiment of the present invention FIG. 3 is a block diagram illustrating the virtual private ledger system utilizing a private blockchain, according to one embodiment of the present invention.

Figure 4:
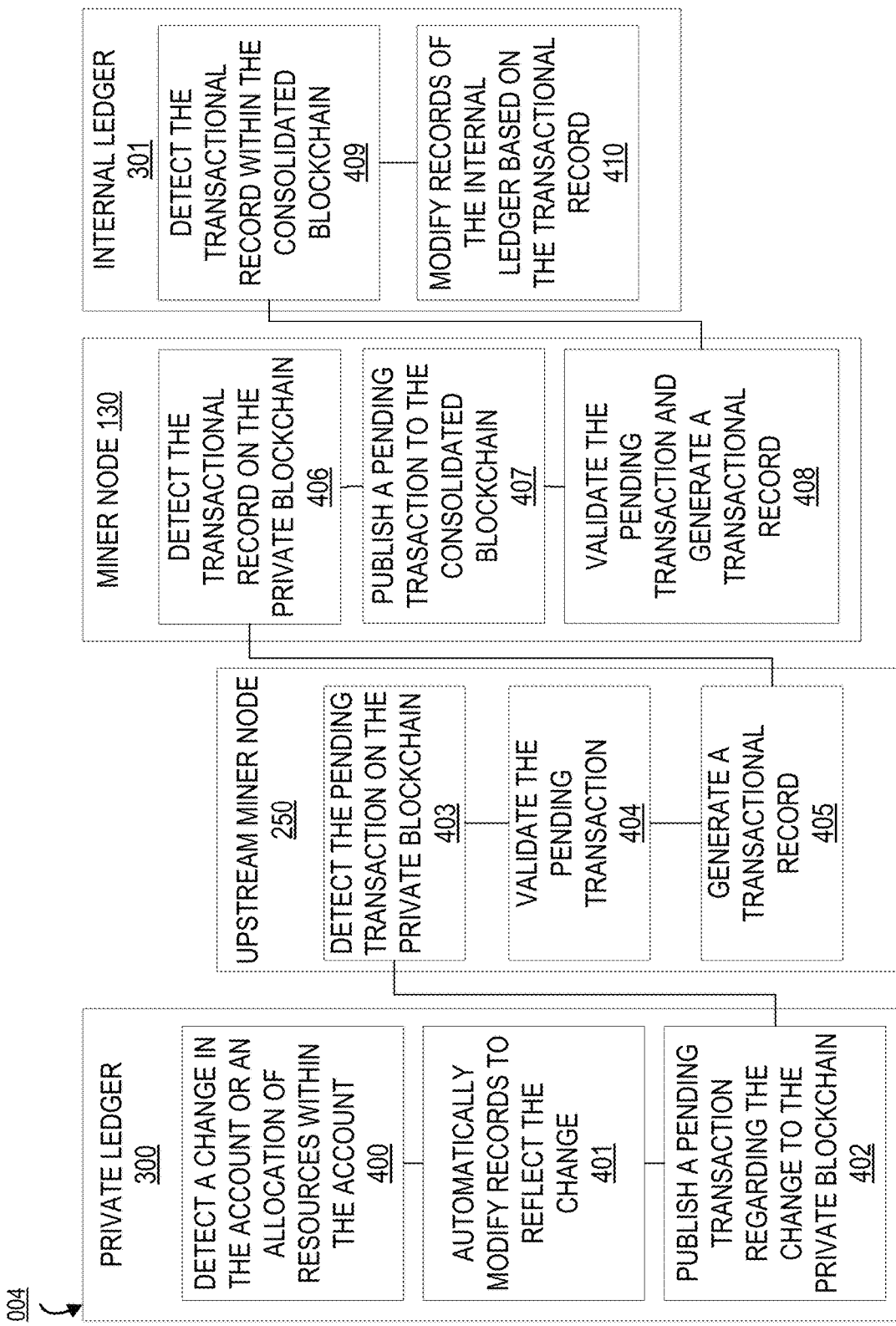
Figure 5:
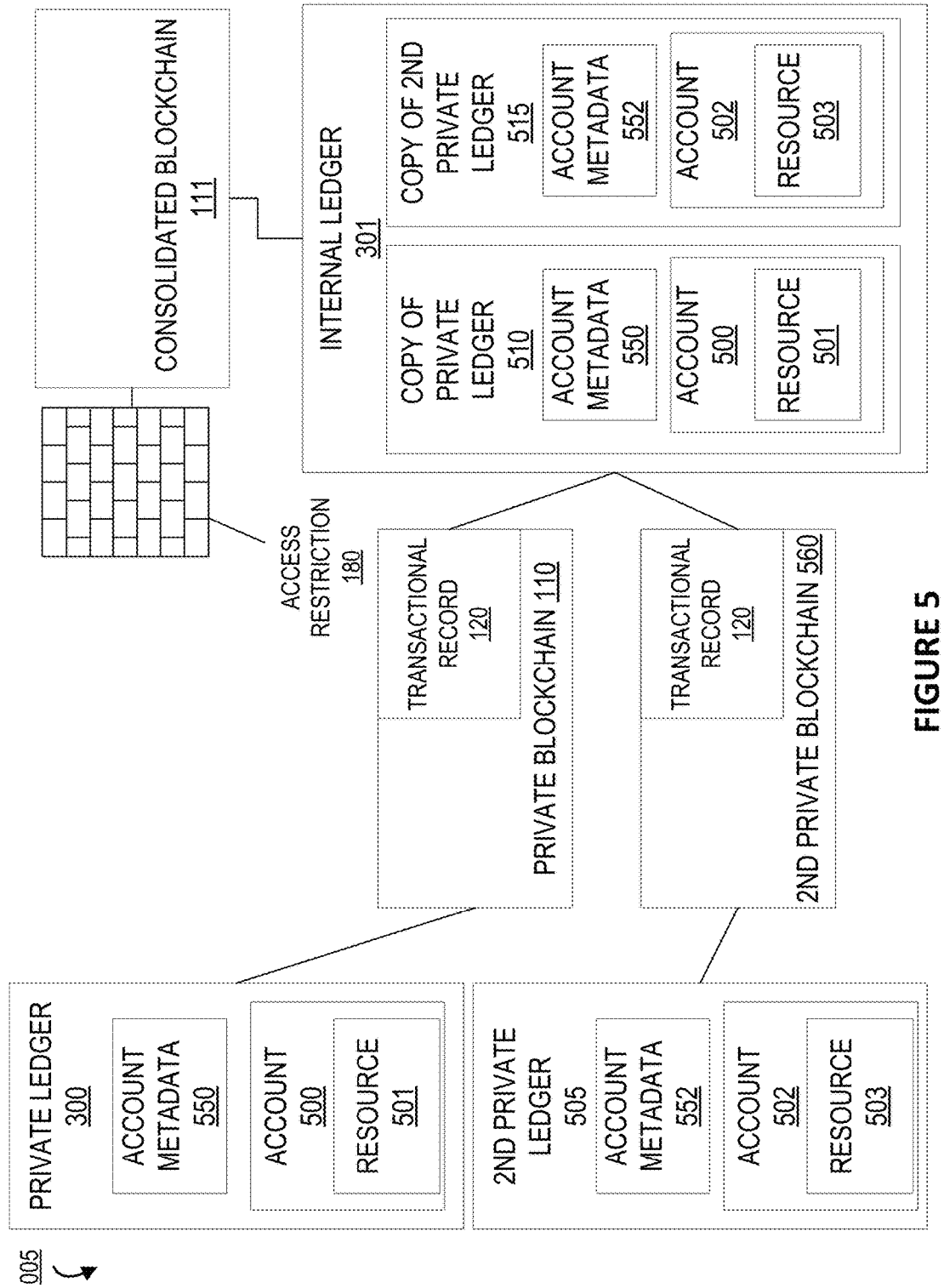
Figure 6:
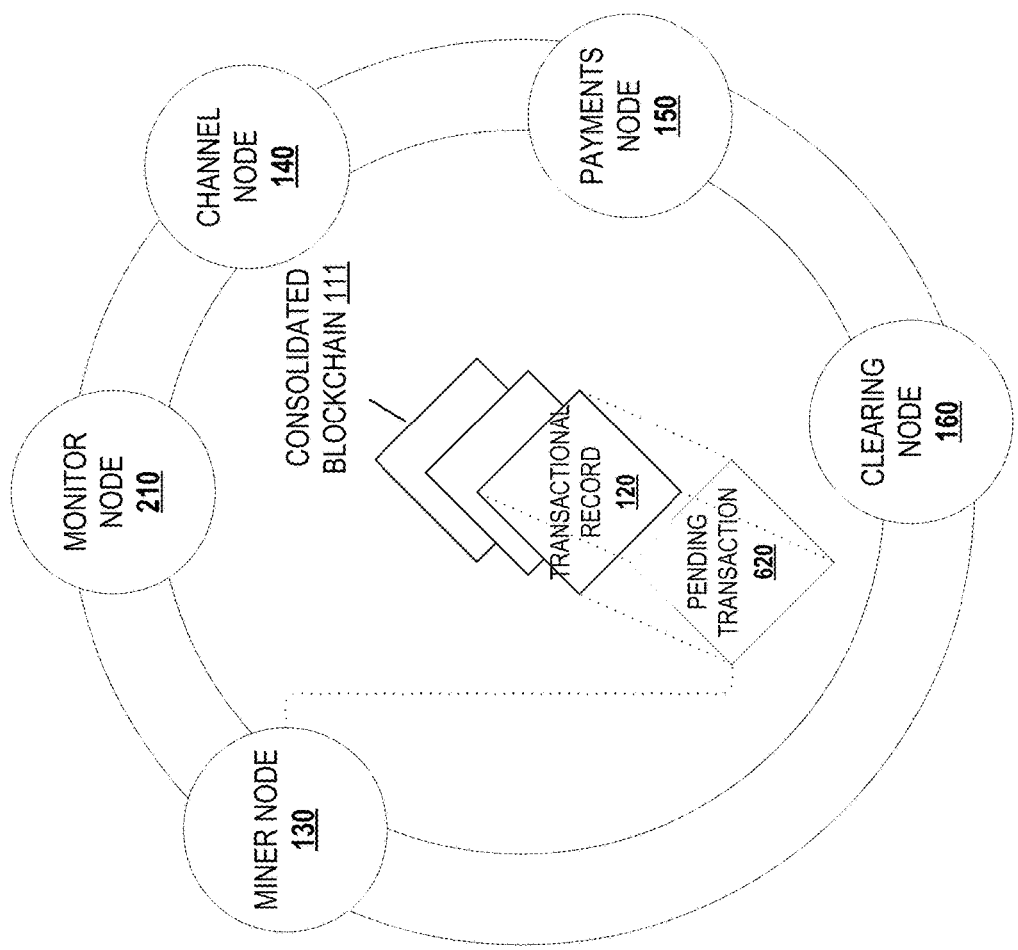
Figure 7:
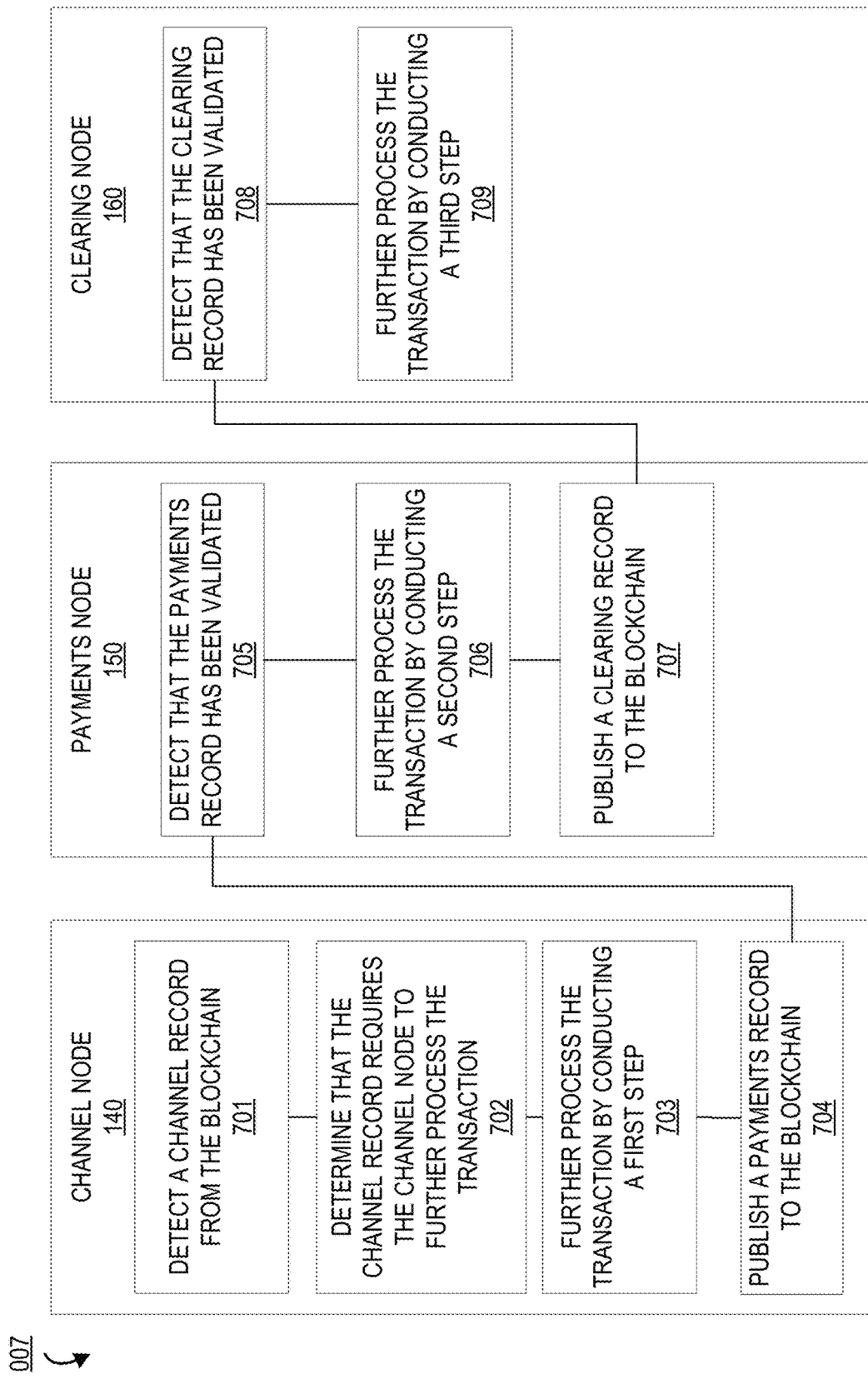
Figure 8:
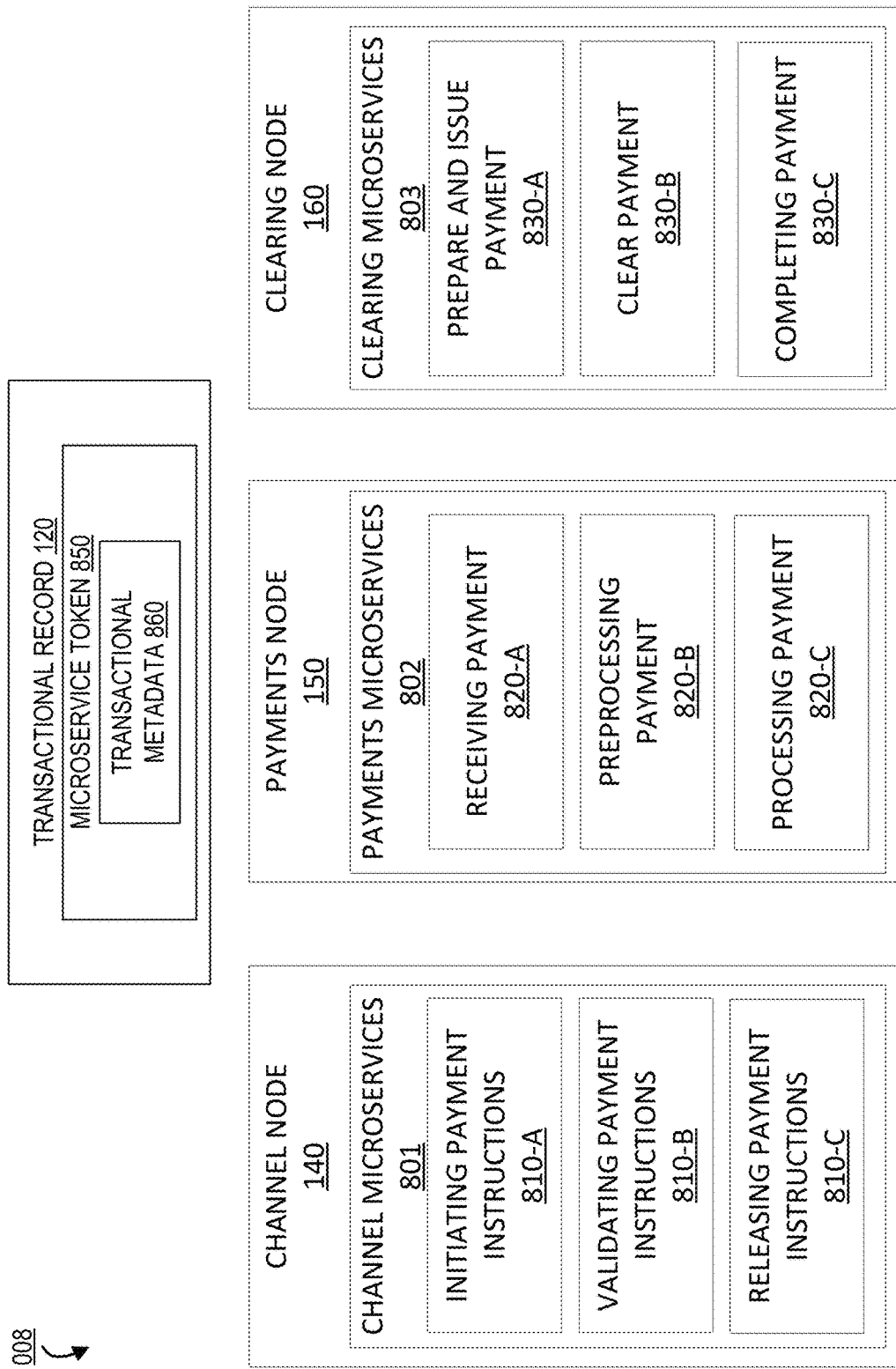
Figure 9:
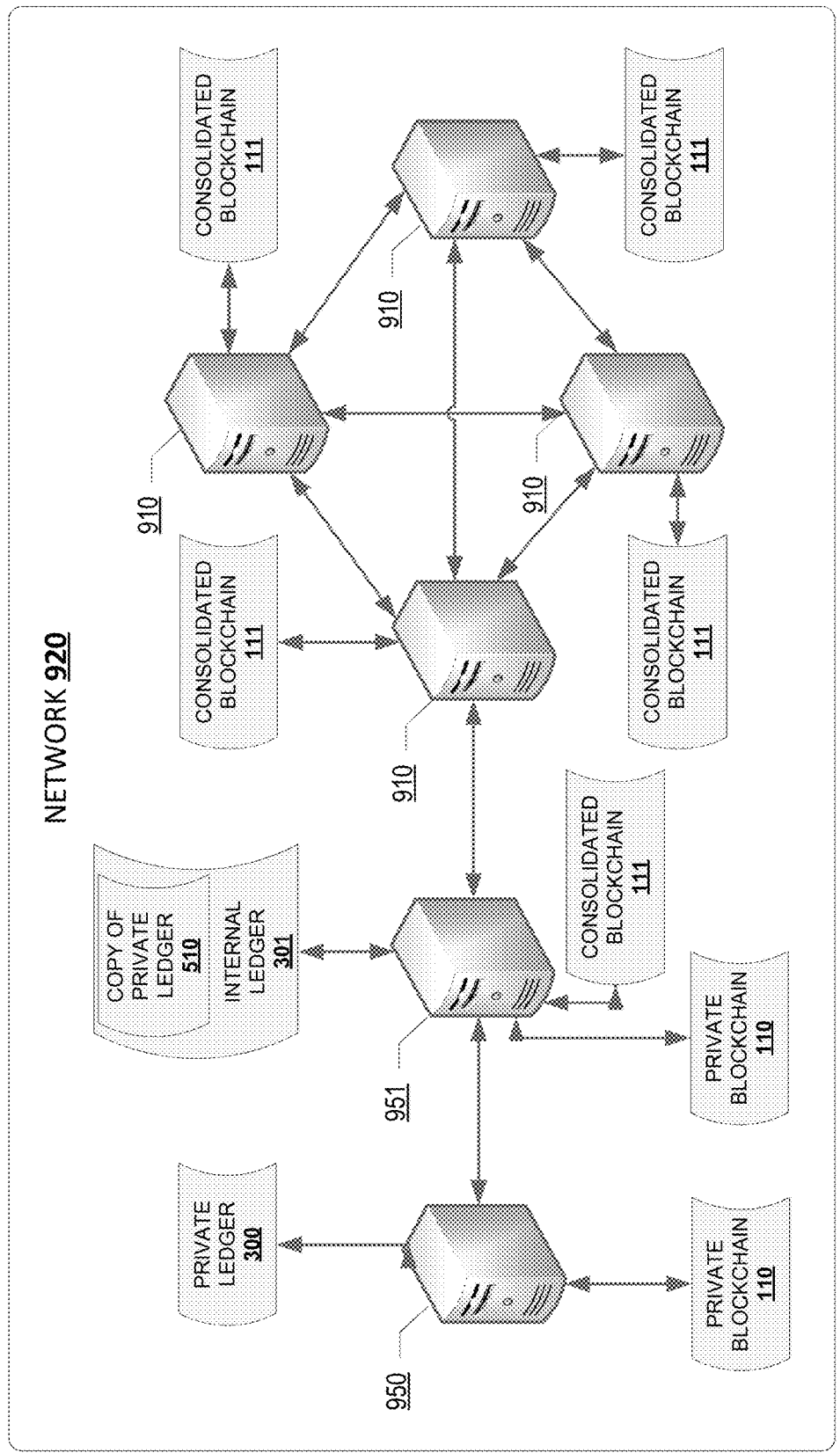
Figure 10:
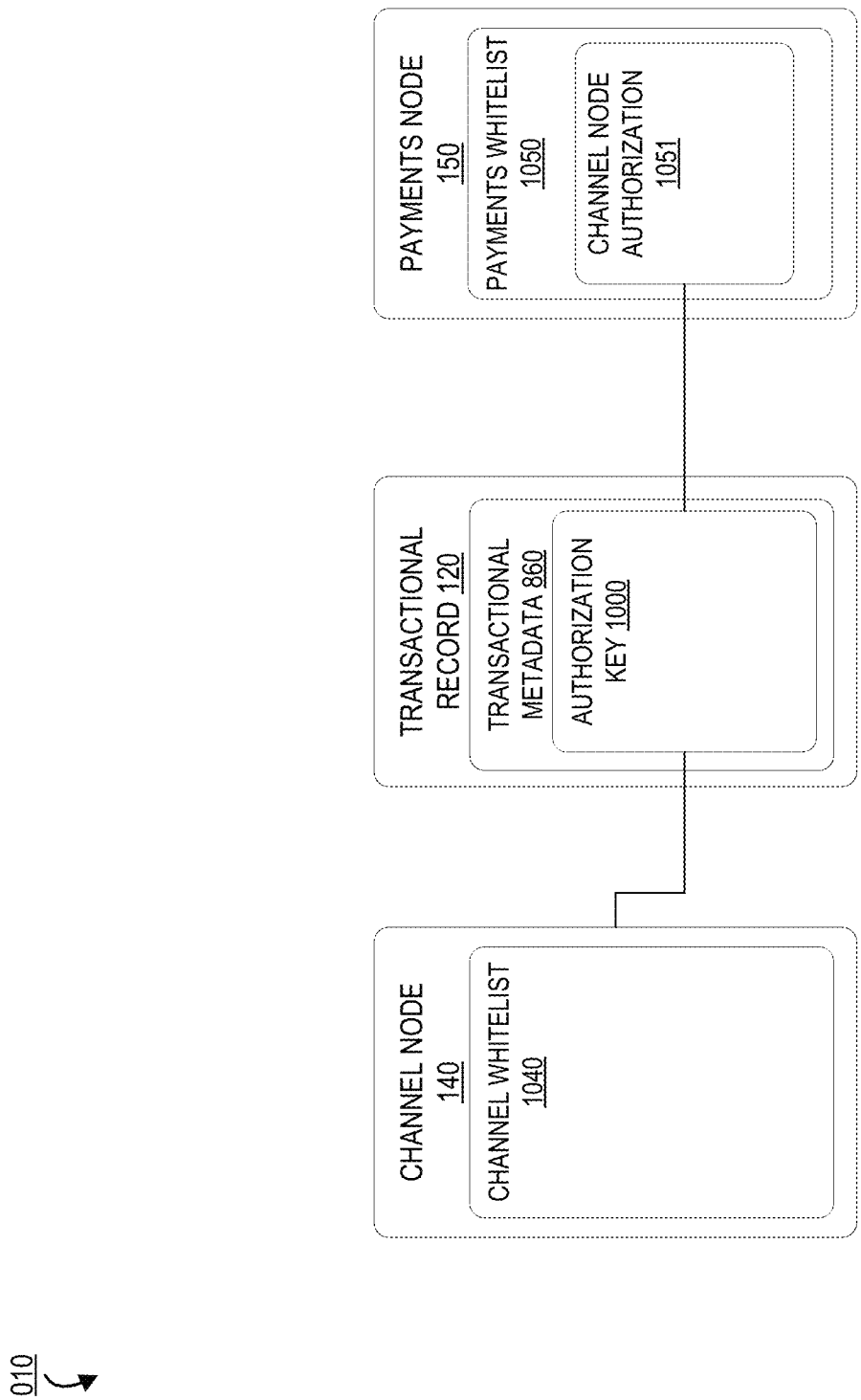

FIG. 4 is a process flow diagram illustrating a process for using a private blockchain to authenticate transactions in a virtual private ledger, in accordance with one embodiment of the present invention;

FIG. 5 is a block diagram illustrating the contents of the ledgers in the upstream and downstream applications, in accordance with one embodiment of the present invention;

FIG. 6 is a block diagram illustrating the types of nodes used to process transactional records in the blockchain, in accordance with one embodiment of the present invention;

FIG. 7 is a combination block and process flow diagram illustrating the workflow of a transaction through the nodes used to process the transaction in the blockchain, in accordance with one embodiment of the present invention;

FIG. 8 is a block diagram illustrating the microservices of the nodes, in accordance with one embodiment of the present invention;

FIG. 9 is a symbol diagram illustrating the computer systems involved maintaining a private blockchain, in accordance with one embodiment of the present invention;

FIG. 10 is a block diagram illustrating a system for implementing authorization keys into a blockchain workflow, in accordance with one embodiment of the present invention.

Figure 11:
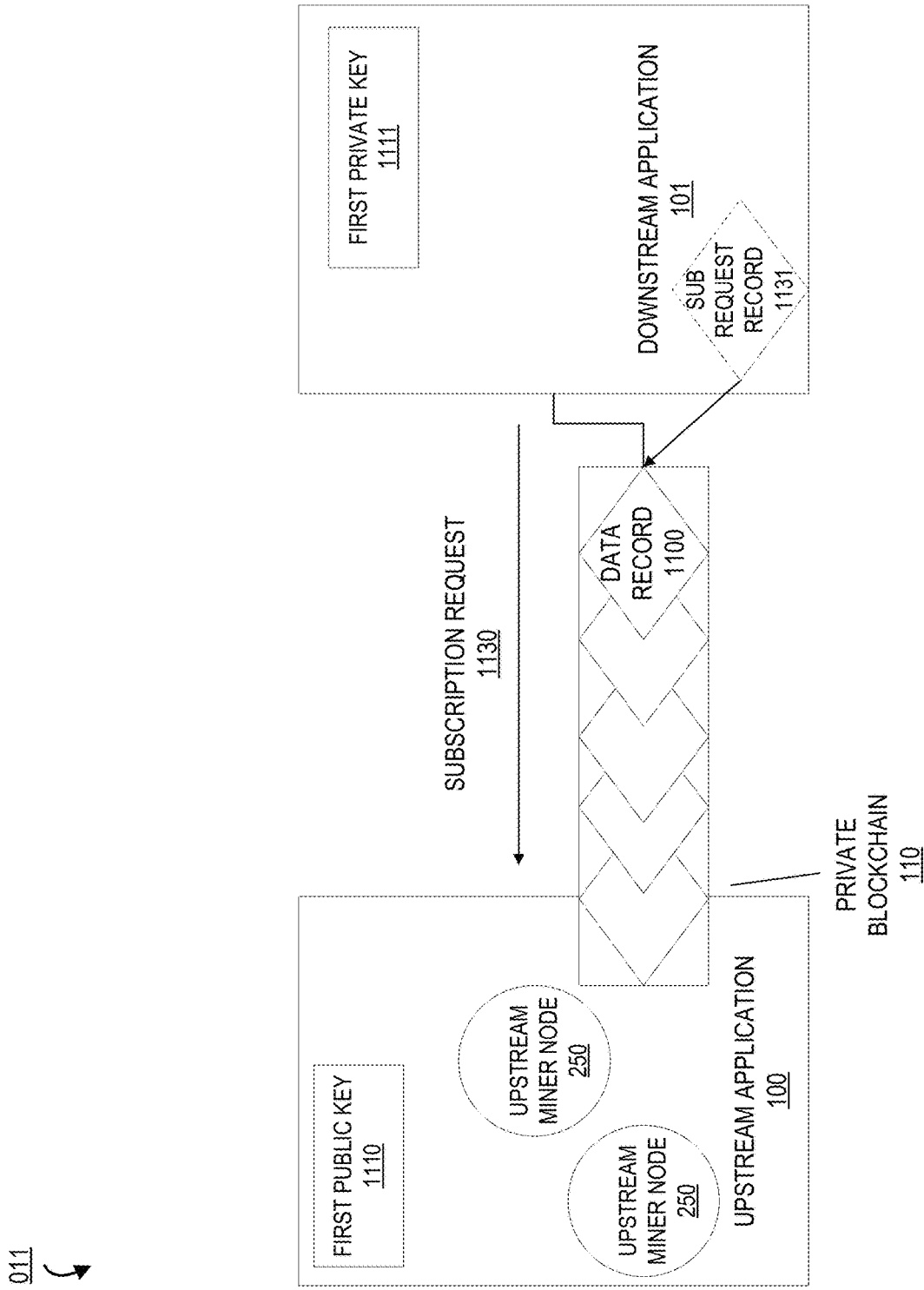
Figure 12:
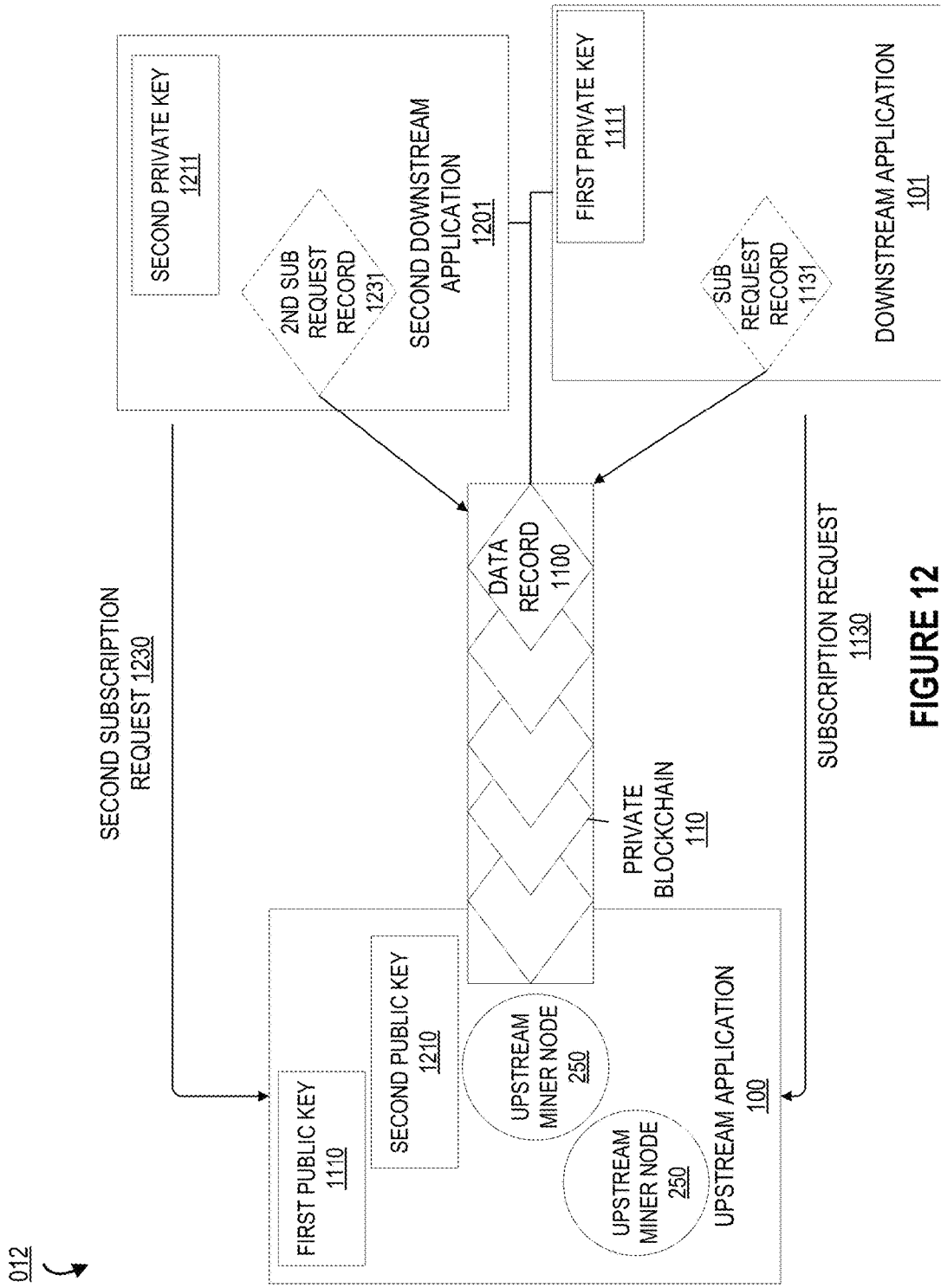
Figure 13:
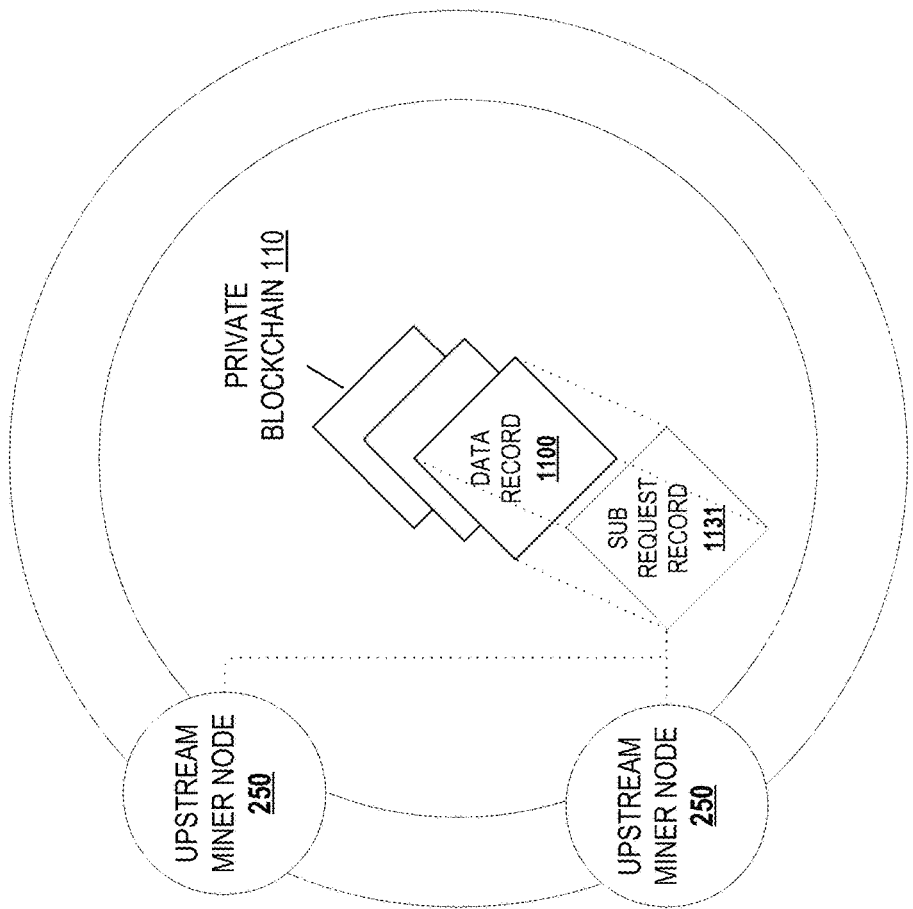
Figure 14:
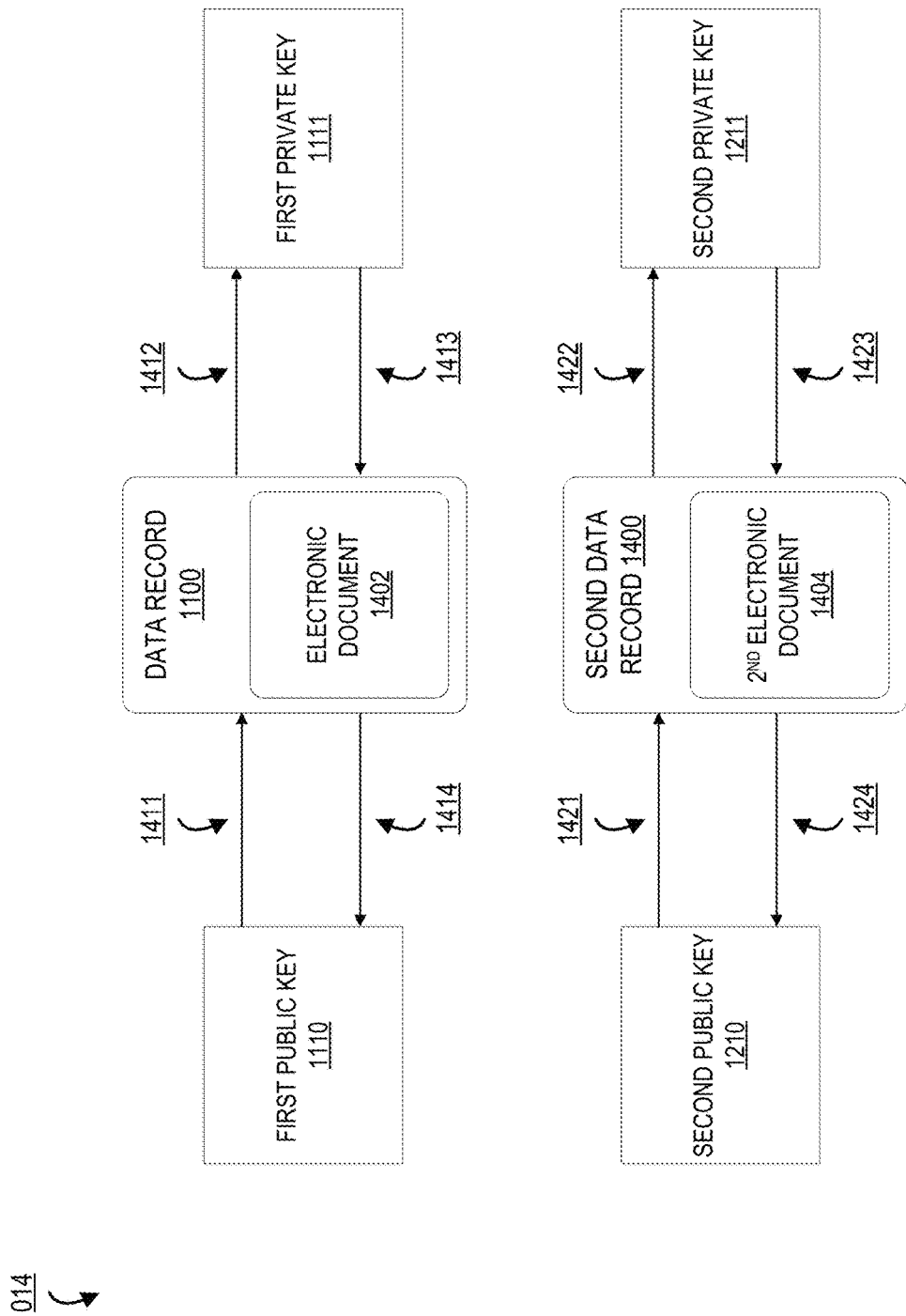
Figure 15:
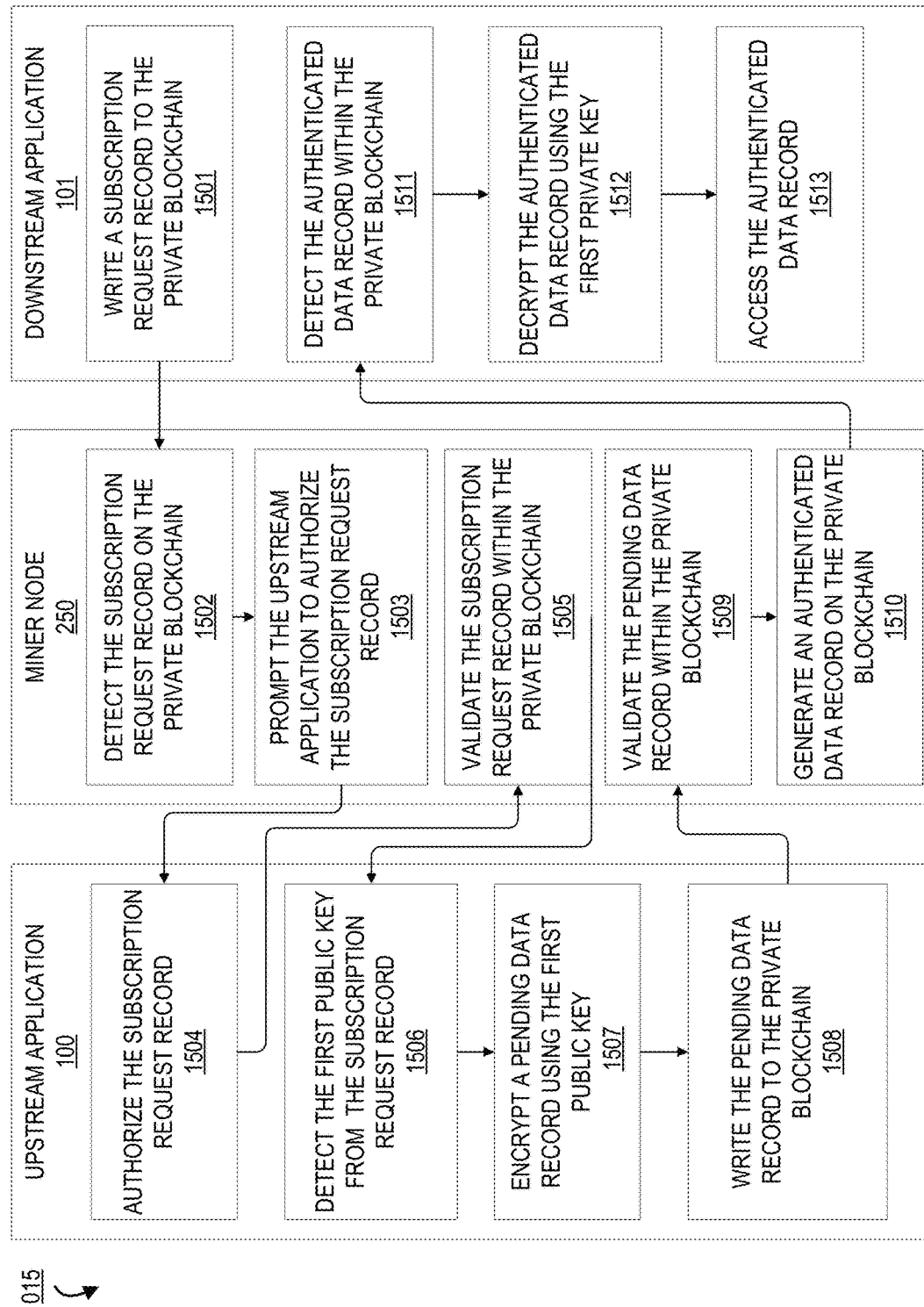

FIG. 11 is a block diagram illustrating a system for storing records on a blockchain and providing access of said records to a service provider, in accordance with one embodiment of the present invention;

FIG. 12 is a block diagram illustrating a system for providing encrypted, exclusive access to records stored on a private blockchain to a plurality of service providers, in accordance with one embodiment of the present invention;

FIG. 13 is a block diagram illustrating a system for processing subscription requests using a private blockchain, in accordance with one embodiment of the present invention;

FIG. 14 is a block diagram illustrating the method of asymmetric cryptography used to secure data on the private blockchain, in accordance with one embodiment of the present invention; and FIG. 15 is a combination block and process flow diagram illustrating a method for providing access to the data records on the private blockchain to a service provider, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Embodiments of the present invention provide a system for expediting validation and authorization of transactions between end points. Embodiments of the invention utilize a private blockchain to control transaction workflow amongst compute nodes, provide automatic authorization of transactions in the workflow, and provide efficient record-keeping functions within the virtual ledgers in an upstream and a downstream application. By using a private distributed ledger in this manner, the system addresses the computer networking-centric challenge of processing transactions in a secure and efficient manner. Thus, embodiments of the invention provide for improving processing efficiencies of the various systems running applications utilizing the private blockchain by avoiding desynchronization of data as well as preventing the need for authorization and confirmation requests amongst the nodes greatly reduces the amount of computing resources required to process transactions, including, but not limited to, processing power, memory space, storage space, cache space, electric power, networking bandwidth, and I/O calls.

Embodiments of the present invention also provide a system for authenticating records belonging to an individual or entity and providing authorized access of said records to service providers. Embodiments of the invention utilize a private blockchain to store various types of records to be conveyed to the service providers. In some embodiments, the records may be electronic documents relating to the services to be requested. For example, the documents may be accounting, financial, or tax records to be sent to an accounting firm or a tax firm. In other embodiments, the documents may be health records to be sent to a healthcare provider. In other embodiments, the documents may be personal or company records to be sent to various types of insurance companies. The electronic documents may exist on the blockchain in numerous file formats, including, but not limited to plaintext, PDF, word processing formats, HTML, and the like. In this way, the individual or entity may securely store on the blockchain all records relevant to service providers, then provide the service providers with secured access to said records such that the providers may access only the specific records for which they are authorized, e.g. a healthcare provider may access only the healthcare records on the blockchain. Providing authorized access of records to service providers in this way confers numerous advantages over traditional methods. First, utilizing the blockchain to store relevant records reduces the number of back-and-forth queries that must be made between the computer servers owned by individual or entity and the service provider, thereby increasing the processing efficiency as described above. Second, storing relevant records on a blockchain provides a reliable and convenient way to store a complete history of all records relevant to receiving a service (e.g. an entire medical history), in contrast to traditional methods, in a loss of records (e.g. due to server instability, user error, etc.) may result in gaps in the record history.

"Blockchain" as used herein refers to a distributed electronic ledger of data records which are authenticated by a federated consensus protocol. Multiple computer systems within the blockchain, referred to herein as "nodes" or "compute nodes," each comprise a copy of the entire ledger of records. Nodes may write a "block" to the blockchain, where the block may comprise data and metadata, including a reference to the previous "block" in the chain. In some embodiments, "data record" or "transactional record" may be a block on the blockchain. By linking blocks in this way, the blockchain contains a reliable history of all relevant records of data and transactions between entities. In some embodiments, the data may relate to a financial transaction. In some embodiments, the data may be files or records belonging to an individual or entity. In some embodiments, the block may further comprise a time stamp and a pointer to the previous block in the chain. In some embodiments, the pointer may be a fix-length hash generated by a hash algorithm. In this way, the order of the blocks in history may be preserved. In some embodiments, the block may further comprise metadata indicating the node that was the originator of the transaction. In this way, the entire record of transactions is not dependent on a single database which may serve as a single point of failure; the blockchain will persist so long as the nodes on the blockchain persist.

A "private blockchain" as used herein is a blockchain in which only authorized nodes may access the blockchain. In some embodiments, nodes must be authorized to write to the blockchain. In some embodiments, nodes must also be authorized to read from the blockchain. In some embodiments, once a transactional record or data record is written to the blockchain, it will be considered pending and awaiting authentication by the miner nodes in the blockchain. In other embodiments, the private blockchain may accept data records as valid without validation by miner nodes.

"Miner node" as used herein refers to a networked computer system that authenticates and verifies the integrity of pending transactions on the blockchain. In some embodiments, the miner node ensures that the sum of the outputs of the transaction within the block matches the sum of the inputs. In some embodiments, a pending transaction may require validation by a threshold number of miner nodes. Once the threshold number of miners has validated the transaction, the block becomes an authenticated part of the blockchain. By using this method of validating transactions via a federated consensus mechanism, duplicate or erroneous transactions are prevented from becoming part of the accepted blockchain, thus reducing the risk of data record tampering and increasing the security of the transactions within the system. In some embodiments, the system may require the miner nodes within the blockchain to calculate a "proof of work" in order to validate the data record.

Some embodiments of the invention may utilize asymmetric cryptography to secure the data records on the private blockchain. For instance, a data record may be encrypted with a first cryptographic key such that the record may only be decrypted using a corresponding second cryptographic key. In such an embodiment, a record encrypted using the second cryptographic key can likewise only be decrypted using the first cryptographic key. In this way, the system provides for a more secure way to prevent unauthorized access to sensitive information while selectively providing the records to the service providers who require them. In some embodiments, the method of asymmetric cryptography may comprise a private key and a public key corresponding to each other, such that data encrypted using the private key may only be decrypted using the public key, and vice versa. In some embodiments, the private key is configured to be used exclusively by a single individual or entity, while the public key may be distributed to one or more individuals or entities. In such an embodiment, data encrypted by the private key serves as an authenticated digital signature, such that recipients of the data may verify the identity of the sender of the data. On the other hand, data encrypted by the public key may only be decrypted by the holder of the public key—in such a case, the sender of the data may verify that the data may only be viewed by the intended recipient, i.e. the sole owner of the corresponding private key.

Embodiments of the invention provide a virtual private ledger system maintained between an upstream entity and a downstream entity. In some embodiments, the downstream entity may be a financial institution. Embodiments use a private ledger to write transaction records to the private blockchain, where the transaction records written to the blockchain represent the transactional data within the private ledger. The downstream entity accesses the private blockchain and uses the data therein to maintain a separate consolidated blockchain. The downstream entity then executes a number of processes based only on the authenticated blocks within the consolidated blockchain, thereby eliminating the need for the downstream application to continuously seek confirmations from the downstream application. This increases the efficiency of the system while simultaneously increasing security and decreasing data error rates.

Embodiments of the invention also provide a system for distributing transaction workflow in a private blockchain. In some embodiments, each of the nodes on the private blockchain are responsible for performing one or more functions to process the transaction. In particular, each node monitors the blockchain for blocks that are relevant to it while ignoring the blocks that are not relevant. Upon discovering a relevant block, the node performs its designated functions to process the transaction, i.e. the blocks within the blockchain trigger the nodes to perform their functions. Once a block has been authenticated, a node may rely on the data record stored therein without utilizing a complex reconciliation system to confirm the data's integrity. By using the blockchain to control the workflow of the transaction, the system may avoid data errors resulting from failure in communications amongst nodes and prevents the need for computing resource-intensive data reconciliation processes.

Embodiments of the invention also provide a system for authorizing blockchain transactions by distributed ledger keys. In such an embodiment, each block comprises a transaction record and an authorization key, indicating the originating node (the sender) of the transaction. The nodes within the private blockchain comprise a "white list," comprising a list of authorized senders of the transaction. In this way, a receiving node will only process a transaction in the blockchain if the sender is one of the authorized senders on the white list; otherwise, the node rejects the transaction, thereby increasing the security of transactions within the system. In some embodiments, the node may write a rejection block to the blockchain.

FIG. 1 is a block diagram providing an overview of a system 001 for expediting validation and authorization of transactions between end points according to one embodiment of the invention. The system comprises an upstream application 100 in operative networked communication with a downstream application 101 via a private blockchain 110. In some embodiments, the private blockchain 110 may be directly embedded into the applications. The private blockchain 110 is shared exclusively the upstream application 100 and the downstream 101 application. By having access to its own native copy of the blockchain, the application is able to eliminate computing inefficiencies caused by excess memory usage, networking latency, and the like.

In some embodiments, the system further comprises a consolidated blockchain 111, which comprises all of the records within the private blockchain 110. The consolidated blockchain is only accessible to the downstream application 101; other applications, such as the upstream application 100 is blocked from accessing the consolidated blockchain 111 via an access restriction mechanism 180. In some embodiments, the access restriction 180 may be entirely a software implementation, such as a firewall. In some embodiments, the access restriction may be a hardware implementation or a physical separation. In some embodiments, the consolidated blockchain 111 may comprise records from multiple upstream applications, each having their own private blockchain.

In some embodiments, the downstream application 101 may further comprise a plurality of nodes on the consolidated blockchain 111, including a miner node 130, a channel node 140, a clearing node 160, and a payments node 150. In some embodiments, each node comprises a copy of all of the data records within the consolidated blockchain 111. In this way, the blockchain 111 is distributed, and the integrity of the data is preserved through a consensus mechanism. In some embodiments, a node is a computer system or an amalgam of computer systems that serves a designated purpose in furthering a transaction.

In some embodiments, the miner node 130 authenticates the transactions in the data records within the consolidated blockchain 111 that may be considered "pending." In some embodiments, a data record may be required to be authenticated by more than one miner node 130 to be considered authenticated. Upon receiving authentication, a pending record may become part of the blockchain as a transactional record 120. In some embodiments, the other nodes on the blockchain 111 will delay executing its specific functions until a transaction has been authenticated by the at least one miner node 130. In some embodiments, the miner node 130 may also authenticate transactions on the private blockchain 110.

In some embodiments, the channel node 140 handles the client-facing end of the transaction. In such an embodiment, the channel node 140 detects transaction requests initiated by the client. In some embodiments, the transaction request may be a payment instructions for a transfer of funds from the client to another entity. Upon detecting that a data record for a transaction request has been authenticated by the miner node 130, the channel node 140 executes its functions to process the transaction request. Upon completing its functions, the channel node 140 may write a data record to the blockchain 111 indicating completion of the channel node's 140 functions.

In some embodiments, the payments node may detect the channel node's completion record from the blockchain once it has been authenticated. In this way, the channel node 140 is in operative communication with the payments node 150 through the consolidated blockchain 111, as illustrated by flow 190. In such an embodiment, the payments node 150 executes its functions to further process the transaction request. In some embodiments, the payments node's 150 functions are controlled by the downstream entity. In some embodiments, the payments node's 150 functions may include conducting the accounting and validation necessary to process the transaction request. Upon completing its functions, the payments node 150 may write a data record to the consolidated blockchain 111 indicating completion of said functions.

In some embodiments, the clearing node 160 may detect the payments node's 150 completion record 120 from the consolidated blockchain 111 once it has been authenticated. In this way, the payments node 150 is in operative communication with the clearing node 160 through the consolidated blockchain 111, as illustrated by flow 191. In such an embodiment, the clearing node 160 executes its functions to perform the clearing step of the transaction. In some embodiments, the clearing node 160 is the terminal node in the transaction and performs the functions needed to finalize the transaction. Upon completing its functions, the clearing node may write a data record to the consolidated blockchain 111 indicating completion of said functions.

In some embodiments, each node is configured to perform only its specific functions, e.g. the clearing node only performs the clearing functions. In other embodiments, a single node may perform multiple designated functions, e.g. the payments node also performs the functions of the miner nodes. In this way, workflow may be distributed such that the computing resources of the system as a whole are optimally utilized.

FIG. 2 is a block diagram illustrating an embodiment of the system 002 comprising additional nodes. In some embodiments, the upstream application may comprise a plurality of upstream nodes on the private blockchain 110, which may include an upstream miner node 250 and an initiation node 260. In some embodiments, pending records within the private blockchain 110 may be authenticated by the upstream miner node 260. In some embodiments, the initiation node 260 may initiate the transaction by writing a pending record to the private blockchain 110.

In some embodiments, the downstream application may comprise at least one additional miner node 230. The system may require that pending transactions be validated by a plurality of miner nodes 130, 230 before becoming authenticated blocks on either the private blockchain 110 or the consolidated blockchain 111. In some embodiments, the systems may impose a minimum threshold number of miner nodes 130, 230 needed to verify each pending transaction. The minimum threshold may be selected to strike a balance between the need for data integrity/accuracy versus expediency of processing. In this way, the efficiency of the computer system resources may be maximized.

In some embodiments, the system may further comprise a monitor node 210 within the downstream application 101 and an upstream monitor node 270 within the upstream application. In such embodiments, the monitor nodes 210 may calculate the rate of transaction records 120 being written to the consolidated blockchain 111, whereas the upstream monitor node 270 may calculate the rate of transaction records being written to the private blockchain 110. In such an embodiment, the rate may be expressed as the number of transaction records 120 being written to the blockchains 110, 111 over a period of time. In this way, the processing efficiency of the system may be evaluated based on the data collected by the monitor nodes 210, 270.

FIG. 3 is a block diagram illustrating an embodiment of the system 003 comprising a virtual ledger system, according to one embodiment of the present invention. In some embodiments, the upstream application 100 may comprise a private ledger 300 that is configured to communicate to the private blockchain 110. In some embodiments, the upstream application 100 is operated a financial institution's client. In some embodiments, the private ledger may contain financial data records, such as data on account information and resources associated with the account. In some embodiments, the private ledger 300 utilizes the private blockchain 110 for its record-keeping functions instead of a centralized database. In this way, the records in the private ledger are not only kept private but also enjoy the reliability and error-correcting functions of a distributed ledger technology.

In some embodiments, the downstream application 101 may comprise an internal ledger 301. In some embodiments, the internal ledger 301 is configured to communicate to the consolidated blockchain 111. In some embodiments, the downstream application 101 may be operated by a financial institution. In some embodiments, the internal ledger 301 comprises the records kept in the private ledger 300. In some embodiments, the internal ledger 301 is configured to read and extract data from the consolidated blockchain 111, which contains copies of the transactional records 120 created by the private ledger 300 from the private blockchain 110. In this way, the system may eliminate the need for back-and-forth rounds of communication to reconcile the records within the two ledgers.

FIG. 4 is a process flow diagram illustrating a process 004 for using a private blockchain to authenticate transactions in a virtual private ledger, in accordance with one embodiment of the present invention. The process begins at block 400, by detecting a change in an account or an allocation of resources within the account. In some embodiments, the account is a client's account with a financial institution. In such an embodiment, the private ledger may be configured to monitor the status of the account to adjust its internal records accordingly.

The process then moves to block 401, by automatically modifying the records within the private ledger to reflect the change in the account. In some embodiments, the change may be an incoming amount of resources account from a third party. In some embodiments, the change may be an outgoing amount of resources to a third party. In some embodiments, the change may be a shift of resources from the account to another account owned by the client.

The process then moves to block 402, by publishing a pending transaction regarding the change to the private blockchain. In some embodiments, the private ledger stores its own copy of the blockchain, i.e. the private ledger serves as a node of the blockchain.

The process then moves to block 403, whereby the upstream miner node detects the pending transaction on the blockchain.

The process then moves to block 404, whereby the upstream miner node validates the pending transaction. In some embodiments, a threshold number of miner nodes may be required to validate the transaction. In some embodiments, the private ledger may additionally perform mining functions.

The process then moves to block 405, by generating a transactional record on the private blockchain. The transactional record is generated from a pending transaction that has been authenticated by the miner nodes.

The process continues to block 406, whereby the miner node of the downstream application detects the transactional record within the private blockchain. In some embodiments, the internal ledger is a node of the private blockchain. In some embodiments, the internal ledger is also a node of the consolidated blockchain. In some embodiments, the internal ledger belongs to a financial institution comprises the client data records within the private ledger.

The process continues to block 407, whereby the miner node publishes a pending transaction to the consolidated blockchain based on the transactional record within the private blockchain. In this way, the consolidated blockchain comprises all of the records within each private blockchain.

The process continues to block 408, whereby the miner node validates the pending transaction and generates a transactional record within the consolidated blockchain. At this point, the transactional record has been authenticated, and the consolidated blockchain comprises authenticated copies of the records within the private blockchain.

The process continues to block 409, whereby the internal ledger detects the transactional record within the consolidated blockchain.

Finally, the process continues to block 410, whereby the internal ledger modifies the records of the internal ledger based on the transactional record within the consolidated blockchain. The internal ledger may modify the records within itself without seeking confirmation from the client/private ledger, i.e. the authenticated transaction within the blockchain itself serves as the confirmation.

FIG. 5 is a block diagram illustrating the contents of the ledgers in the upstream and downstream applications within the system 005, in accordance with one embodiment of the present invention. The private ledger 300 comprises data records of an account 500, the account 500 comprising at least one resource 501. In some embodiments, the resource may be funds within a financial account. The private ledger 300 is operatively connected to the internal ledger 301 via the private blockchain 110, the private blockchain 110 comprising at least one transactional record 120, which is authenticated by a miner node 130.

In some embodiments, the system further comprises a second private ledger 505, which further comprises account metadata 552 and an account 502, which comprises at least one resource 503. The second private ledger 505 is in operative communication with the internal ledger 301 via a second private blockchain 560, which comprises at least one transactional record 120. In some embodiments, the private ledger 300 and the second private ledger 505 are owned by distinct entities. In such an embodiment, the private ledger 300 cannot access the second private blockchain 560, and the second private ledger 505 cannot access the private blockchain 110.

In some embodiments, the internal ledger 301 comprises a copy of the private ledger 510, which comprises the account 500 and resource 501 data. In some embodiments, the internal ledger 301 may further comprise a copy of the second private ledger 515. In this way, blockchain technology is used to reconcile the records within the private ledgers 300, 505 and the internal ledger 301, which protects against data desynchronization. The internal ledger 301 reads the records from the consolidated blockchain 111, which in turn comprises the records within the private blockchains 110, 560. While the downstream application may access both the consolidated blockchain and the private blockchains 110, 560, the upstream application is prevented from accessing the consolidated blockchain 111 via an access restriction 180.

In some embodiments, the private ledger 300 may further comprise a set of account metadata 550 associated with the allocation of resources. In some embodiments, the account metadata 550 may include data on how the resources are to be designated within the account, such as whether the resources are designated as "outgoing," i.e. to be sent to a third party. In some embodiments, the account metadata 550 may comprise data on the intended recipients of outgoing resources, i.e. the third party's identity.

FIG. 6 is a block diagram illustrating the types of nodes in the system 006 that are used to process transactional records in the blockchain, in accordance with one embodiment of the present invention. In some embodiments, the channel node 140, payments node 150, or the clearing node 160 may publish a pending transaction 620 to the consolidated blockchain 111. At this stage, the transaction has not yet been validated by the miner node(s) 130, and the other nodes will delay executing their designated processes. The miner node 130 may be configured to detect a pending transaction 620 in the blockchain and conduct its processes to evaluate the validity of the data therein. Upon verifying the integrity of the data in the pending transaction 620, the miner node validates the transaction and adds the data as a transactional record 120 to the private blockchain. Once a transaction has been authenticated in this manner, the nodes will consider the transactional record 120 to be valid and thereafter execute their designated processes accordingly.

FIG. 7 is a combination block and process flow diagram illustrating the workflow 007 of a transaction through the nodes used to process the transaction in the blockchain, in accordance with one embodiment of the present invention. The process begins at block 701, whereby the channel node 140 detects a channel record from the blockchain. In some embodiments, the channel record may be a transactional record that has been created by an upstream application operated by a client of a financial institution, wherein the channel record is a record of a transaction involving the client. In such an embodiment, the channel node 140 is a client-facing node that monitors the blockchain for transactional records generated by the client.

The process continues to block 702, by determining that the channel record requires the channel node 140 to further process the transaction. In some embodiments, the channel node 140 reads the data and metadata within the channel record to determine that it must execute its functions to further process the transaction. In some embodiments, the channel record may contain data specifically intended to be detected by a specific channel node. In other embodiments, the channel record may contain data intended to be detected by a plurality of different nodes.

The process continues to block 703, by further processing the transaction by conducting a first step. In some embodiments, the first step comprises the various functions to be executed by the channel node 140.

The process continues to block 704, by publishing a payments record to the blockchain. In some embodiments, the payments record is a transactional record that indicates the completion of the functions of the channel node. In some embodiments, the payments record signals to other nodes that the transaction is ready for further processing through the functions executed by the other nodes.

The process continues to block 705, whereby the payments node 150 detects that a payments record has been validated. In some embodiments, the validation is conducted by the miner node. In some embodiments, the payments record may contain data specifically intended to be detected by the payments node.

The process continues to block 706, by the payments node 150 further processing the transaction by conducting a second step. In some embodiments, the second step comprises the various functions to be executed by the payments node 150.

The process continues to block 707, by publishing a clearing record to the blockchain. In some embodiments, the clearing record contains data that signals the completion of the functions of the payments node 150. In some embodiments, the clearing record signals to other nodes that the transaction is ready for further processing.

The process continues to block 708, whereby the clearing node 160 detects that the clearing record has been validated. In some embodiments, the clearing record is a transactional record that may contain data specifically intended to be detected by the clearing node 160.

The process continues to block 709, by the clearing node further processing the transaction by conducting a third step. In some embodiments, the third step comprises the functions to be executed by the clearing node.

FIG. 8 is a block diagram illustrating the microservices of the nodes within the system 008, in accordance with one embodiment of the present invention. In some embodiments, the channel node 140 may further comprise channel microservices 801, which in turn comprises a series of microservices conducted in steps, such as initiating payment instructions 810-A, validating payment instructions 810-B, and releasing payment instructions 810-C. In some embodiments, the channel node 140 may write a transactional record 120 to the blockchain with the execution of each of the microservices. In this way, the transactional record 120 contains a microservices token 850, wherein the microservices token comprises metadata 860 describing the step at which the end-to-end transaction is being processed. In some embodiments, the microservice token 850 is specific to each microservice of each node of the blockchain. In this way, the workflow of the transactions on the blockchain may by dynamically modified in a secure manner while reducing error rates. For example, the channel node 140 may write a transactional record 120 to the blockchain upon validating payment instructions 810-B. The transactional record 120 would contain a microservice token 850 specific to 810-B, which would further comprise transactional metadata 860 to indicate that the transaction is currently on step 810-B. At this point, a different node on the blockchain may detect the transactional record and conduct its functions, which may include the release of payment instructions. In such an embodiment, the channel node 140 may be configured to skip step 810-C to allow another node to further process the transaction.

In some embodiments, the payments node 150 may comprise payments microservices 802, which in turn further comprise receiving payment 820-A, preprocessing payment 820-B, and processing the payment 820-C.

In some embodiments, the clearing node 160 may comprise clearing microservices, which in turn further comprise preparing and issuing payment 830-A, clearing the payment 830-B, and completing the payment 830-C. In some embodiments, the nodes 140, 150, 160 may be configured to detect a specific microservice token 850 and read the transactional metadata 860 within, and in turn execute a specific microservice or a set of microservices to further process the transaction. In this way, a dynamic method of distributing transaction workflow on a private blockchain is provided.

FIG. 9 is a symbol diagram illustrating the computer systems involved the system 009 for maintaining a private blockchain, in accordance with one embodiment of the present invention. In some embodiments, an upstream networked system 950 is in operative communication with a downstream networked computer system 951 over a network 920. A private ledger 300 is stored on the upstream networked system 950, which is configured to read the records within the private blockchain 110, which is also stored on the upstream networked system 950. In some embodiments, the downstream networked system 951 comprises an internal ledger 301, which in turn comprises a copy of the private ledger 510. The downstream networked system further comprises both the private blockchain 110 and the consolidated blockchain 111. The upstream networked system 950 is restricted from accessing the consolidated blockchain 111.

In some embodiments, a plurality of computer systems 910 are in operative networked communication with one another and with the downstream networked system 951 through a network 920. The network 920 may be a system specific distributive network receiving and distributing specific network feeds and identifying specific network associated triggers. The network 920 may also be a global area network (GAN), such as the Internet, a wide area network (WAN), a local area network (LAN), or any other type of network or combination of networks. The network 920 may provide for wireline, wireless, or a combination wireline and wireless communication between devices on the network 920.

In some embodiments, the computer systems 910 represent the nodes of the consolidated blockchain 111, e.g. the miner node 130. In such an embodiment, each of the computer systems 910 comprise the consolidated blockchain 111, providing for distributed access to the blockchain 111 as well as the ability to use a consensus mechanism to verify the integrity of the data therein. In some embodiments, the computer systems 910 may rely on the consolidated blockchain 111 as a means for authorizing, authenticating, and triggering transactions as well as directing transaction workflow.

In some embodiments, a copy of private blockchain 110 may be stored on a durable storage medium within the computer systems 910 or the upstream system 950 or the downstream system 951. In some embodiments, the durable storage medium may be RAM. In some embodiments, the durable storage medium may be a hard drive or flash drive within the system.

FIG. 10 is a block diagram illustrating a system 010 for implementing authorization keys into a blockchain workflow, in accordance with one embodiment of the present invention. In some embodiments, the transactional metadata 860 within a transactional record 120 may comprise an authorization key 1000, which indicates the sender of a transaction. In some embodiments, the sender of a transaction may be a node, such as the channel node 140. In some embodiments, the nodes may further comprise a whitelist of authorized senders. In such embodiments, the nodes may be configured to execute its functions to further process the transaction if the transactional record 120 indicates through its authorization key 1000 that the sender is an authorized sender. In some embodiments, the nodes may be configured to decline to execute its functions if the sender is not on the authorized list of senders within the whitelist. In this way, the system provides for a way to further improve the efficiency of the workflow of transactions on the private blockchain, as it removes the need for the nodes within the system to spend computing resources to send separate authorization requests to one another to authorize transactions. In some embodiments, some of the whitelists for some nodes may be different from the whitelists of other nodes.

For example, the channel node 140 may comprise a channel whitelist 1040, and the payments node 150 may comprise a payments whitelist 1050. In some embodiments, for example, the channel node 140 may write a transactional record 120 to the blockchain. In such an embodiment, the authorization key 1000 within the transactional metadata 860 will comprise a record stating that the channel node 140 is the sender of the transaction (i.e. the node that wrote the record to the blockchain for further processing by other nodes). In such an embodiment, the payments node may detect the authorization key 1000 from the transactional record 120 and compare the record within the authorization key 1000 with the payments whitelist 1050, which may further comprise a channel node authorization 1051, indicating that the channel node was the sender of the transaction. Upon detecting that the channel node 140 is an authorized sender, the payments node 150 may then continue to execute its functions to further process the transaction. On the other hand, other transactional records 120 may appear as a result of senders which are not on the payments whitelist 1050. In such a case, the payments node 150 will decline to execute its functions to process transactions in which the sender is not authorized.

FIG. 11 is a block diagram illustrating a system 011 for storing records on a blockchain and providing access of said records to a service provider, in accordance with one embodiment of the present invention. In some embodiments, an upstream application 100 is in operative communication with a downstream application 101 via a private blockchain 110. In some embodiments, the upstream application 100 is owned by an individual or entity, and the downstream application 101 is owned by a service provider, such as a healthcare provider or insurance company. The private blockchain comprises at least one data record 1100. In some embodiments, the upstream application comprises a plurality of miner nodes 250 to validate the pending data records 1100 within the private blockchain. Once a pending data record 1100 has been validated, it becomes an authenticated data record 1100 and becomes a permanent part of the blockchain 110. In some embodiments, the data record 1100 may be encrypted using a cryptographic key within the upstream application 100. In some embodiments, the system uses asymmetric cryptography to secure the data record, wherein the upstream application 100 comprises a first public key 1110 and the downstream application 101 comprises a first private key 1111 that corresponds to the first public key 1110, such that a data record 1100 encrypted using the first public key 1110 may only be decrypted using the first private key 1111, and vice versa. In some embodiments, the data record 1100 may comprise a document, image, or other media to be provided to the downstream application 101. In some embodiments, the downstream application 101 may send a subscription request 1130 to the upstream application 100, by which the downstream application 101 requests secured access to certain data records 1100 within the private blockchain 110. In some embodiments, this is accomplished by the downstream application 101 publishing a subscription request record 1131 to the private blockchain, the subscription request record 1131 containing the first public key 1110.

FIG. 12 is a block diagram illustrating a system 012 for providing encrypted, exclusive access to records stored on a private blockchain to a plurality of service providers, in accordance with one embodiment of the present invention. In some embodiments, the system may further comprise a second downstream application 1201. In some embodiments, the second downstream application 1201 is owned by a distinct service provider from the one that owns the downstream application 101. In some embodiments, the upstream application 100 further comprises a second public key 1201, and the second downstream application 1201 comprises a second private key 1211 that corresponds to the second public key 1210, such that a data record encrypted using the second public key 1210 may only be decrypted using the second private key 1211, and vice versa. In some embodiments, the upstream application 100 may select a cryptographic key to encrypt the data record 1100 depending on its intended recipient; for instance, the upstream application may use the first public key 1110 to encrypt data records containing documents to be sent exclusively to the downstream application 101, and it may use the second public key 1210 to encrypt data records containing documents to be sent exclusively to the second downstream application 1201. In this way, the downstream application 101 may only access the data records which were encrypted using the first public key 1110, and the second downstream application 1201 may only access the data records which were encrypted using the second public key 1210. In some embodiments, the second downstream application 1201 sends a second subscription request 1230 to the upstream application 100, through which the second downstream application 1201 requests access to specific data records 1100 within the private blockchain 110. In some embodiments, this is accomplished by the second downstream application 1201 publishing a second subscription request record 1231 to the private blockchain, the second subscription request record 1231 containing the second public key 1210. In some embodiments, the records requested by the second downstream application 1201 are distinct from those records requested by the downstream application 101.

FIG. 13 is a block diagram illustrating a system 013 for processing subscription requests using a private blockchain, in accordance with one embodiment of the present invention. A downstream application may wish to subscribe to, or request access to, certain records within the private blockchain of the upstream entity. In some embodiments, the downstream application may write a subscription request record 1131 to the private blockchain 110, where the subscription request record 1131 contains a cryptographic public key associated with a cryptographic private key owned by the downstream application. In some embodiments, a plurality of miner nodes 250 may monitor the private blockchain for subscription request records submitted by downstream applications. Upon detecting the subscription request record 1131, the miner nodes 250 may prompt the upstream application to authorize or deny the subscription request. Upon receiving authorization from the upstream application, the miner nodes 250 may validate the subscription request record 1131 such that it is permanently added to the private blockchain 110. Once the subscription request record 1131 has been validated, the upstream application may extract the cryptographic public key from the request record 1131 and use it to encrypt any data records 1100 to be sent to the corresponding downstream entity, which the downstream entity may decrypt and access using its unique cryptographic private key.

FIG. 14 is a block diagram illustrating the system 014 of asymmetric cryptography used to secure data on the private blockchain, in accordance with one embodiment of the present invention. In some embodiments, the first public key 1110 is used to encrypt a data record 1100, as seen in step 1411, such that the data record 1100 may only be decrypted using the first private key 1111. In some embodiments, the data record 1100 comprises an electronic document 1402 to be accessed by a service provider, e.g. a completed tax form or accounting records. The service provider may use its first downstream public key 1110 to decrypt the data record 1100 to access the electronic document 1402 within, as shown in step 1412. In some embodiments, the first downstream public key 1111 may only be distributed to one specific service provider. In other embodiments, the first downstream public key 1111 may be distributed to multiple service providers of a specific type, e.g. insurance companies.

In some embodiments, a service provider may wish to send encrypted data back to the individual or entity owning the upstream application. In such an embodiment, the service provider uses the first private key 1111 to encrypt another data record 1100, which may comprise another electronic document 1402, as seen in step 1413. The first public key 1110 is then used to decrypt the data record 1100 to access the data within, as seen in step 1414. In this way, the system provides for a secure method of transferring data back and forth between a service provider and its client.

In some embodiments, the second public key 1210 is used to encrypt a second data record 1400 to be provided to a second service provider, as seen in step 1421. The second data record 1400 may comprise a second electronic document 1404. In some embodiments, the second electronic document 1404 may be a different document from the electronic document 1402 mentioned previously. In some embodiments, the documents may be identical. The second service provider uses the second private key 1211 to decrypt the second data record 1400 to access the second electronic document 1404 within, as shown in step 1422. In some embodiments, the service provider owning the first private key 1111 is separate from and unrelated to the second service provider owning the second private key 1211. In such an embodiment, the individual or entity owning the first and second public keys 1110, 1210 may select a public key to encrypt a data record depending upon its intended recipient, i.e. the first or second service provider, and ensure that only the intended recipient may decrypt the data record.

In some embodiments, the second service provider may use the second private key to encrypt data to be sent to the individual or entity owning the second public key 1210, as can be seen in step 1423. The second public key 1210 may then be used to decrypt the data to allow the individual or entity to access the data therein.

FIG. 15 is a combination block and process flow diagram illustrating a method 015 for providing access to the data records on the private blockchain to a service provider, in accordance with one embodiment of the present invention. The process begins at step 1501 within the downstream application, by writing a subscription request record to the private blockchain. In some embodiments, the subscription request record may comprise a cryptographic public key. In some embodiments, the cryptographic public key may be a first public key.

The process continues to step 1502 within the miner node, by detecting the subscription request record on the private blockchain.

The process continues to step 1503 within the miner node, by prompting the upstream application to authorize the subscription request record.

The process continues to step 1504 within the upstream application, by authorizing the subscription request record. In some embodiments, the authorization may take place manually, in which an administrator of the upstream application expressly authorizes the subscription request. In some embodiments, the authorization may take place automatically, in which the upstream application authorizes the subscription request based on the downstream application's identity, such as through a predetermined whitelist.

The process continues to step 1505 within the miner node, by validating the subscription request record within the private blockchain. In some embodiments, this step causes the subscription request record to become a permanent block on the private blockchain.

The process continues to step 1506 within the upstream application, by detecting the first public key from the subscription request record. In some embodiments, the upstream application may save the first public key in a separate database and recall it on an as-needed basis.

The process continues to step 1507, by encrypting a pending data record using the first public key. In some embodiments, the pending data record may comprise data to be conveyed to the downstream application 101. In some embodiments, the upstream application may recall the first public key and use it to encrypt all data records to be sent to the downstream application.

The process continues to block 1508 by writing the pending data record to the private blockchain. In some embodiments, the nodes of the private blockchain owned by the individual or entity associated with the upstream application 100, with each node comprising a copy of the private blockchain.

The process continues to block 1509, wherein the miner node 250 validates the pending data record within the private blockchain. In some embodiments, the system may require the pending data record to comprise a proof of work to be considered validated by the miner nodes. In some embodiments involving a private blockchain, the system may adjust the difficulty of calculating the proof of work depending on the number of miner nodes in the system. For instance, for a private blockchain which may comprise relatively fewer miner nodes compared to a public blockchain, the system may reduce the difficulty of calculating the proof of work to maintain a reasonable calculation time.

The process continues to block 1510, by generating an authenticated data record on the private blockchain. In some embodiments, the authenticated data record may signal to the downstream application 101 that the information within the data record is genuine.

The process then continues to block 1511, wherein the downstream application 101 detects the authenticated data record within the private blockchain. In some embodiments, the downstream application 101 may decline to access the data record until it has been authenticated by the miner node 250.

The process then continues to block 1512, by decrypting the authenticated data record using the first private key. In some embodiments, the private key is known only to the downstream application. In this way, the system may ensure that only the downstream application may decrypt the files which are intended to be received by the downstream application.

Finally, the process concludes at block, 1513, by accessing the decrypted, authenticated data record. In some embodiments, the downstream application 101 may use the data within the data record to provide specific services, such as processing tax records or validating insurance claims.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authenticating records and providing authorized access of said records to service providers, comprising:

an upstream networked system comprising an upstream processor, a memory device, and a communication device, and an upstream application stored in the memory device, wherein the upstream application is in operative communication with a downstream application, wherein the upstream application comprises a private blockchain comprising at least one data record;

a downstream networked system comprising a downstream processor, a memory device, and a communication device, and the downstream application stored in the memory device; and a plurality of nodes on the private blockchain, wherein the plurality of nodes comprises a miner node comprising a miner networked system comprising a miner processor, a memory device, and a communication device, and a miner application stored in the memory device, wherein the plurality of nodes further comprise a monitor node configured to calculate a rate of data records being written to the private blockchain, wherein the monitor node evaluates processing efficiency based on the rate of data records being written to the private blockchain;

wherein the upstream application when executed by the upstream processor causes the upstream processor to:
  automatically authorize a subscription request record on the private blockchain based on identifying the downstream application from a predetermined whitelist, the whitelist comprising a plurality of authorized senders, wherein the subscription request record comprises a request by the downstream application for secured access to one or more private records owned by an individual associated with the upstream application;
  detect, from the subscription request record on the private blockchain, a first public key;
  encrypt, using the first public key, a pending data record to be received by the downstream application;
  publish the pending data record to the private blockchain;
  detect a second authenticated data record on the private blockchain; and
  decrypt the second authenticated data record using the first public key;

wherein the miner application when executed by the miner processor causes the miner processor to:
  detect the subscription request record on the private blockchain;
  prompt the upstream application to authorize the subscription request record;
  in response to the upstream application authorizing the subscription request record on the private blockchain, validate the subscription request record;
  validate the pending data record within the private blockchain;
  generate an authenticated data record on the private blockchain, wherein the authenticated data record comprises sender identification data;
  validate a second pending data record on the private blockchain; and
  generate the second authenticated data record on the private blockchain;

wherein the downstream application when executed by the downstream processor causes the downstream processor to:
  write the subscription request record to the private blockchain, wherein the subscription request record comprises the first public key;
  detect the authenticated data record within the private blockchain;
  decrypt the authenticated data record using a first private key;

access the authenticated data record; and
encrypt, using the first private key, the second pending data record to be received by the upstream application.

2. The system of claim 1, further comprising a second downstream networked system comprising a second downstream processor, a memory device, and a communication device, and a second downstream application stored in the memory device,
wherein the upstream application when executed by the upstream processor further causes the upstream processor to:
encrypt a third pending data record to be received by the second downstream application; and
publish the third pending data record to the private blockchain,
wherein the miner application when executed by the miner processor causes the miner processor to:
validate the third pending data record within the private blockchain; and
generate a third authenticated data record on the private blockchain, wherein the third authenticated data record comprises the sender identification data, wherein the second downstream application when executed by the second downstream processor causes the second downstream processor to:
detect the third authenticated data record within the private blockchain;
decrypt the third authenticated data record; and
access the third authenticated data record.

3. The system of claim 2, wherein the second downstream application when executed by the second downstream processor further causes the second downstream processor to:
write a second subscription request record to the private blockchain, wherein the second subscription request record comprises a second public key,
wherein the miner application when executed by the miner processor further causes the miner processor to:
detect the second subscription request record on the private blockchain;
prompt the upstream application to authorize the second subscription request record; and
validate the second subscription request record,
wherein the upstream application when executed by the upstream processor further causes the upstream processor to:
authorize the second subscription request record; and
detect the second public key from the subscription request record.

4. The system of claim 3, wherein the second downstream application comprises a second private key, wherein the second public key corresponds with the second private key, wherein the upstream application when executed by the upstream processor further causes the upstream processor to:
encrypt the pending data record using the first public key; and
encrypt the third pending data record using the second public key,
wherein the downstream application when executed by the downstream processor further causes the downstream processor to:
decrypt the authenticated data record using the first private key, and
wherein the second downstream application when executed by the second downstream processor causes the downstream processor to:
decrypt the third authenticated data record using the second private key.

5. A computer-implemented method for authenticating records and providing authorized access of said records from an upstream processor of an upstream networked system to a downstream processor of a downstream networked system using a plurality of nodes, wherein the upstream networked system comprises a memory device and a communication device, wherein an upstream application is stored on the memory device,
wherein the downstream networked system comprises a memory device and a communication device, wherein a downstream application is stored on the memory device,
wherein the upstream networked system is in operative communication with the downstream networked system via a private blockchain, the private blockchain comprising at least one data record, and
wherein the plurality of nodes are nodes on the private blockchain, and comprises a miner node comprising a miner networked system comprising a miner processor, a memory device, and a communication device, and a miner application stored in the memory device, wherein the plurality of nodes further comprise a monitor node configured to calculate a rate of data records being written to the private blockchain, wherein the monitor node evaluates processing efficiency based on the rate of data records being written to the private blockchain,
said method comprising:
writing, by the downstream processor executing the downstream application, a subscription request record to the private blockchain, wherein the subscription request record comprises a first public key;
detecting, via the miner processor executing the miner application, the subscription request record on the private blockchain;
prompting, via the miner processor executing the miner application, the upstream application to authorize the subscription request record;
automatically authorizing, via the upstream processor executing the upstream application, the subscription request record based on identifying the downstream application from a predetermined whitelist, the whitelist comprising a plurality of authorized senders, wherein the subscription request record comprises a request by the downstream application for secured access to one or more private records owned by an individual associated with the upstream application;
validating, via the miner processor executing the miner application, the subscription request record within the private blockchain;
detecting, via the upstream processor executing the upstream application, the first public key from the subscription request record;
encrypting, by the upstream processor executing the upstream application, using the first public key, a pending data record to be received by the downstream application;
publishing, by the upstream processor executing the upstream application, the pending data record to the private blockchain;
validating, by the miner processor executing the miner application, the pending data record within the private blockchain;

generating, by the miner processor executing the miner application, an authenticated data record on the private blockchain, wherein the authenticated data record comprises sender identification data;

detecting, by the downstream processor executing the downstream application, the authenticated data record within the private blockchain;

decrypting, by the downstream processor executing the downstream application, using a first private key, the authenticated data record;

accessing, by the downstream processor executing the downstream application, the authenticated data record;

encrypting, by the downstream processor executing the downstream application, using the first private key, a second pending data record to be received by the upstream application;

validating, via the miner processor executing the miner application, the second pending data record on the private blockchain;

generating, via the miner processor executing the miner application, a second authenticated data record on the private blockchain;

detecting, via the upstream processor executing the upstream application, the second authenticated data record on the private blockchain; and decrypting, via the upstream processor executing the upstream application, the second authenticated data record using the first public key.

6. The computer-implemented method in claim 5, wherein a second downstream networked system is in operative communication with the upstream networked system, the second downstream networked system comprising a second downstream processor, a memory device, and a communication device, and a second downstream application stored in the memory device, said method further comprising:

encrypting, by the upstream processor executing the upstream application, a third pending record to be received by the second downstream application;

publishing, by the upstream processor executing the upstream application, the third pending record to the private blockchain;

validating, by the miner processor executing the miner application, the third pending record within the private blockchain; and generating, by the miner processor executing the miner application, a third authenticated record on the private blockchain, wherein the third authenticated record comprises the sender identification data;

detecting, by the second downstream processor executing the second downstream application, the third authenticated record within the private blockchain;

decrypting, by the second downstream processor executing the second downstream application, the third authenticated record; and accessing, by the second downstream processor executing the second downstream application, the third authenticated record.

7. The computer-implemented method in claim 6, further comprising:

writing, by the second downstream processor executing the second downstream application, a second subscription request record to the private blockchain, wherein the second subscription request record comprises a second public key;

detecting, by the miner processor executing the miner application, the second subscription request record on the private blockchain;

prompting, by the miner processor executing the miner application, the upstream application to authorize the second subscription request record;

authorizing, by the upstream processor executing the upstream application, the second subscription request record;

validating, by the miner processor executing the miner application, the second subscription request record; and detecting, by the upstream processor executing the upstream application, the second public key from the subscription request record.

8. The computer-implemented method of claim 7, wherein the second downstream application comprises a second private key, wherein the second public key corresponds with the second private key, said method further comprising:

encrypting, by the upstream processor executing the upstream application, the pending record using the first public key;

encrypting, by the upstream processor executing the upstream application, the third pending record using the second public key;

decrypting, by the downstream processor executing the downstream application, the authenticated record using the first private key; and decrypting, by the downstream processor executing the second downstream application, the third authenticated record using the second private key.

9. A computer program product for authenticating and providing authorized access of records, the computer program product comprising at least one non-transitory computer readable medium having computer-readable program code portions embodied therein, the computer-readable program code portions comprising:

an executable portion for, by a downstream processor executing a downstream application, writing a subscription request record to a private blockchain, wherein the subscription request record comprises a first public key;

an executable portion for, via a miner processor executing a miner application, detecting the subscription request record on the private blockchain;

an executable portion for, via a monitor node processor executing a monitor node application, calculating a rate of data records being written to the private blockchain, an executable portion for, via the monitor node processor executing the monitor node application, evaluating processing efficiency based on the rate of data records being written to the private blockchain;

an executable portion for, via the miner processor executing the miner application, prompting an upstream application to authorize the subscription request record;

an executable portion for, via an upstream processor executing the upstream application, automatically authorizing the subscription request record based on identifying the downstream application from a predetermined whitelist, the whitelist comprising a plurality of authorized senders, wherein the subscription request record comprises a request by the downstream application for secured access to one or more private records owned by an individual associated with the upstream application;

an executable portion for, via the miner processor executing the miner application, validating the subscription request record within the private blockchain;

an executable portion for, via the upstream processor executing the upstream application, detecting the first public key from the subscription request record;

an executable portion for, by the upstream processor executing the upstream application, using the first public key, encrypting a pending data record to be received by the downstream application;

an executable portion for, by the upstream processor executing the upstream application, publishing the pending data record to the private blockchain;

an executable portion for, by the miner processor executing the miner application, validating the pending data record within the private blockchain;

an executable portion for, by the miner processor executing the miner application, generating an authenticated data record on the private blockchain, wherein the authenticated data record comprises sender identification data;

an executable portion for, by the downstream processor executing the downstream application, detecting the authenticated data record within the private blockchain;

an executable portion for, by the downstream processor executing the downstream application, decrypting, using a first private key, the authenticated data record;

an executable portion for, by the downstream processor executing the downstream application, accessing the authenticated data record;

an executable portion for, by the downstream processor executing the downstream application, encrypting, using the first private key, a second pending data record to be received by the upstream application;

an executable portion for, via the miner processor executing the miner application, validating the second pending data record on the private blockchain;

an executable portion for, via the miner processor executing the miner application, generating a second authenticated data record on the private blockchain;

an executable portion for, via the upstream processor executing the upstream application, detecting the second authenticated data record on the private blockchain; and an executable portion for, via the upstream processor executing the upstream application, decrypting the second authenticated data record using the first public key.

10. The computer program product of claim 9, the computer-readable program code portions further comprising:

an executable portion for, by the upstream processor executing the upstream application, encrypting a third pending record to be received by a second downstream application;

an executable portion for, by the upstream processor executing the upstream application, publishing the third pending record to the private blockchain;

an executable portion for, by the miner processor executing the miner application, validating the third pending record within the private blockchain;

an executable portion for, by the miner processor executing the miner application, generating a third authenticated record on the private blockchain, wherein the third authenticated record comprises the sender identification data;

an executable portion for, by a second downstream processor executing the second downstream application, detecting the third authenticated record within the private blockchain;

an executable portion for, by a second downstream processor executing the second downstream application, decrypting the third authenticated record; and an executable portion for, by the second downstream processor executing the second downstream application, accessing the third authenticated record.

11. The computer program product of claim 10, the computer-readable program code portions further comprising:

an executable portion for, by the second downstream processor executing the second downstream application, writing a second subscription request record to the private blockchain, wherein the second subscription request record comprises a second public key;

an executable portion for, by the miner processor executing the miner application, detecting the second subscription request record on the private blockchain;

an executable portion for, by the miner processor executing the miner application, prompting the upstream application to authorize the second subscription request record;

an executable portion for, by the upstream processor executing the upstream application, authorizing the second subscription request record;

an executable portion for, by the miner processor executing the miner application, validating the second subscription request record; and an executable portion for, by the upstream processor executing the upstream application, detecting the second public key from the subscription request record.

12. The computer program product of claim 11, wherein the second downstream application comprises a second private key, wherein the second public key corresponds with the second private key, wherein the computer-readable program code portions further comprise:

an executable portion for, by the upstream processor executing the upstream application, encrypting the pending record using the first public key;

an executable portion for, by the upstream processor executing the upstream application, encrypting the third pending record using the second public key;

an executable portion for, by the downstream processor executing the downstream application, decrypting the authenticated record using the first private key; and an executable portion for, by the second downstream processor executing the second downstream application, decrypting the third authenticated record using the second private key.

* * * * *